US007844951B2

(12) United States Patent  
Chen et al.

(10) Patent No.: US 7,844,951 B2  
(45) Date of Patent: Nov. 30, 2010

(54) SPECIFICATION GENERATION FROM IMPLEMENTATIONS

(75) Inventors: Feng Chen, Urbana, IL (US); Nikolai Tillmann, Redmond, WA (US); Wolfgang Grieskamp, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1371 days.

(21) Appl. No.: 11/322,982

(22) Filed: Dec. 30, 2005

(65) Prior Publication Data

US 2007/0157169 A1 Jul. 5, 2007

(51) Int. Cl.  
G06F 9/44 (2006.01)

(52) U.S. Cl. ................. 717/124; 125/126; 125/127; 125/131; 125/106

(58) Field of Classification Search .............. None  
See application file for complete search history.

(56) References Cited

U.S. PATENT DOCUMENTS

| 7,089,537 B2 * | 8/2006 | Das et al. ............. 717/132 |
| 2006/0010428 A1 * | 1/2006 | Rushby et al. .......... 717/124 |
| 2007/0143742 A1 * | 6/2007 | Kahlon et al. .......... 717/124 |

OTHER PUBLICATIONS

Zhang et al., "Path-Oriented Test Data Generation using Symbolic Execution and Constraint Solving Techniques," IEEE, Feb. 4, 2009.*

Artho et al., "Automated Testing using Symbolic Model Checking and Temporal Monitoring," Theoretical Computer Science, Mar. 16, 2004.*

Chen et al., "Discovering Specifications," *Microsoft Research, Technical Report*, Oct. 2005, 10 pages.

Ernst et al., "Dynamically Discovering Likely Program Invariants to Support Program Evolution," *IEEE Trans. Softw. Eng.*, 27(2):99-123, 2001.

Flanagan et al., "Houdini, an Annotation Assistant for ESC/Java," *FME '01: Proceedings of the International Symposium of Formal Methods Europe on Formal Methods for Increasing Software Productivity*, 2001, pp. 500-517.

Gannod et al., "A Specification Matching Based Approach to Reverse Engineering," *ICSE '99: Proceedings of the 21st International Conference on Software Engineering*, 1999, 10 pages.

Gannod et al., "Strongest Postcondition Semantics as the Formal Basis for Reverse Engineering," *The Journal of Automated Software Engineering*, vol. 3, No. 1/2, 1996, pp. 139-164.

Henkel et al., "Discovering Algebraic Specifications from Java Classes," *Proc. 17th European Conference on Object-Oriented Programming*, 2003, 25 pages.

Li et al., "PR-Miner: Automatically Extracting Implicit Programming Rules and Detecting Violations in Large Software Code," *13th ACM SIGSOFT Symposium on the Foundations of Software Engineering (FSE '05)*, Sep. 2005, pp. 306-315.

(Continued)

*Primary Examiner*—Insun Kang  
(74) *Attorney, Agent, or Firm*—Klarquist Sparkman, LLP

(57) ABSTRACT

A computerized method receives an implementation comprising a modifier method and an observer method of a class implementing an abstract data type. The method symbolically executes the modifier method to obtain constrained states, and applies the observer method in constrained states to obtain specialized axioms. The method then creates a specification from the obtained specialized axioms based on generalizing, merging and simplifying the specialized axioms.

15 Claims, 8 Drawing Sheets

OTHER PUBLICATIONS

Logozzo, "Automatic Inference of Class Invariants," *Proceedings of the 5th International Conference on Verification, Model Checking and Abstract Interpretation* (*VMCAI '04*), vol. 2937 of Lectures Notes in Computer Science, Springer-Verlag, Jan. 2004, pp. 211-222.

Sagiv et al., "Parametric Shape Analysis Via 3-Valued Logic," *ACM Trans. Program. Lang. Syst.*, 24(3):217-298, 2002.

Taghdiri, "Inferring Specifications to Detect Errors in Code," *Automated Software Engineering* (*ASE*), Sep. 20, 2004, 10 pages.

Tillmann et al., "Parameterized Unit Tests," *Technical Report MSR-TR-2005-64*, May 2005, 25 pages.

Tillmann et al., "Unit Tests Reloaded: Parameterized Unit Testing with Symbolic Execution," *MSR-TR-2005-153*, Nov. 2005, 17 pages.

Xie et al., "Mutually Enhancing Test Generation and Specification Inference," *Proc. 3rd International Workshop on Formal Approaches to Testing of Software*, vol. 2931 of LNCS, 2003, pp. 60-69.

Yang et al., "Terracotta: Mining Temporal API Rules From Imperfect Traces," *Mid-Atlantic Programming Language Seminar*, Nov. 18, 2005, 10 pages.

* cited by examiner

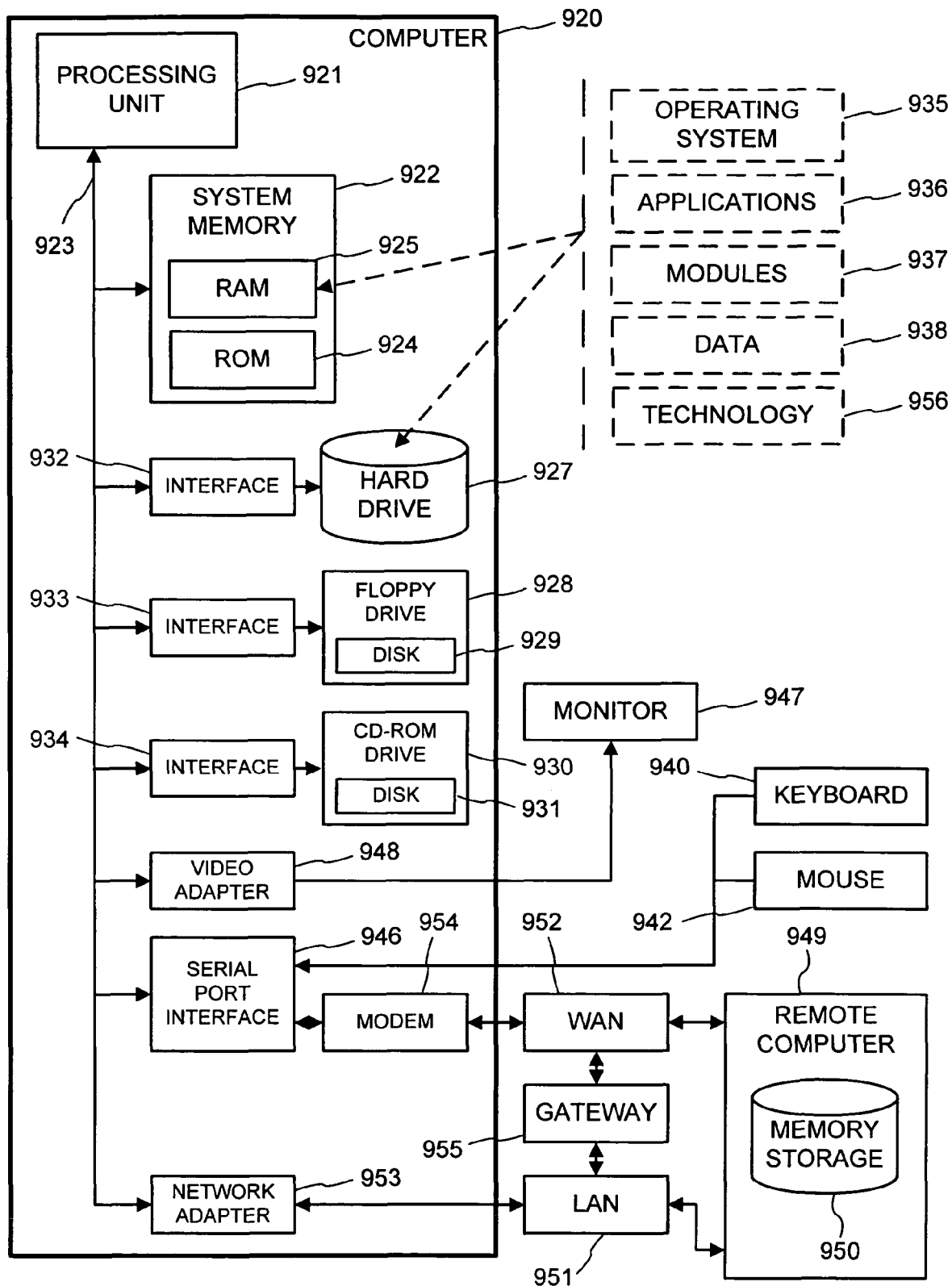

SPECIFICATION GENERATION FROM IMPLEMENTATIONS

FIELD

The technical field relates to software specifications, and more particularly, generating a specification from an implementation.

BACKGROUND

Specifications play an important role in software verification. In formal verification the correctness of an implementation is proved or disproved with respect to a specification. In automated testing a specification can be used for guiding test generation and checking the correctness of test executions. Most importantly specifications also serve human understanding; specifications summarize important properties of an implementation on a higher abstraction level. They are necessary for program understanding, and facilitate code reviews. However, specifications often do not exist in practice, whereas code is abundant.

SUMMARY

The described technology infers specifications from code, such as an implementation. Given an implementation of an abstract data type (e.g., .exe, .dll, etc.), the described technology infers axioms of its observable behavior.

In one example, a computerized method generates a specification from an implementation. For example, the method receives an implementation of a modifier method and an observer method. The method symbolically executes the modifier method to obtain constrained states, and applies the observer method in constrained states to obtain specialized axioms. The method then creates a specification from the obtained specialized axioms.

In another example, a computer system has a processor and computer memory with various software components including a modifier method, plural observer methods, a symbolic executor, an observation generator, and a specification generator. The symbolic executor receives the modifier method and returns modifier path conditions. The observation generator applies an observer method on states of a modifier path to obtain path specific axioms. The specification generator simplifies path specific axioms into general axioms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 and the following discussion are intended to provide a brief, general description of a suitable computing environment for generating a specification from an implementation.

DETAILED DESCRIPTION

Overview

Figure 1:
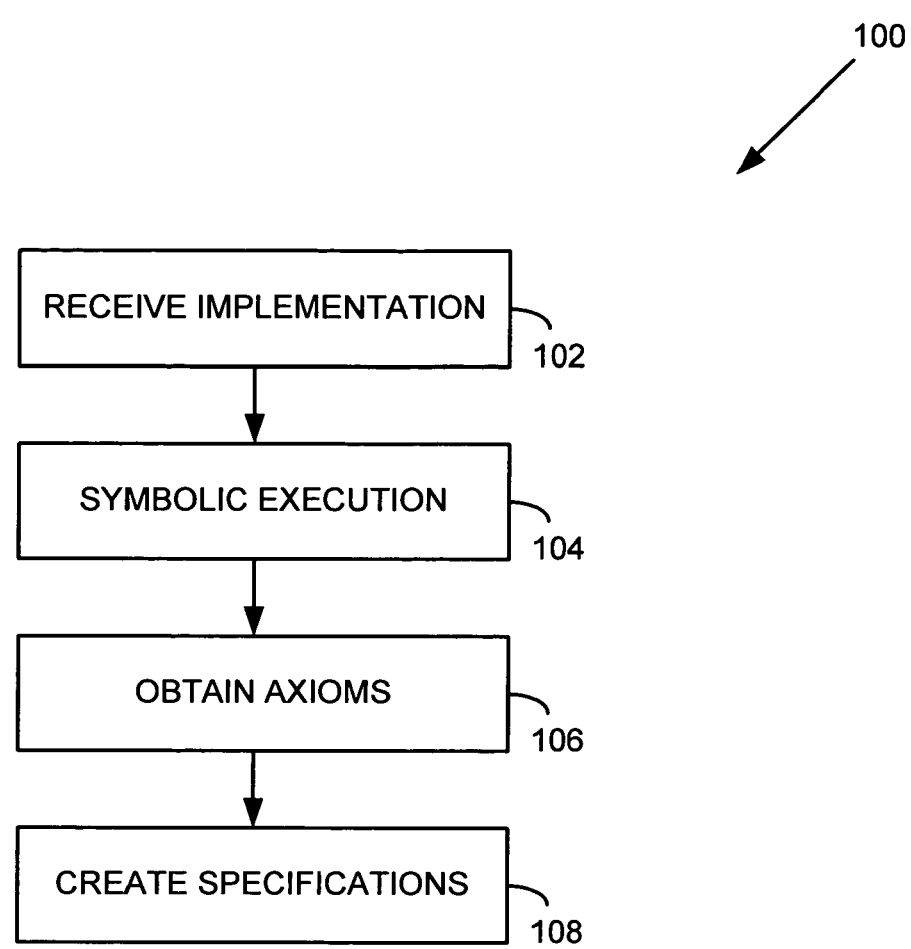
FIG. 1 is a flow chart of an exemplary method generating a specification from an implementation.

The technology provides the possibility of making specifications a first class artifact of software development, for example, by mining existing code to provide specifications. For the task of specification inference, it is preferred that the mined code is relatively complete, does not crash too often, and serves its purpose most of the time. Of course, faithfully inferred specifications would reflect these flaws.

In one example, the technology infers specifications for classes, such as those implementing abstract data types (ADTs). The technique distinguishes between methods that may modify the state of the ADT from methods that inspect the state of the ADT. The former set of methods are called modifier methods, and the latter set are called observer methods. Given classes implementing an ADT, the user chooses a modifier method for which a specification is desired, and the user chooses a set of one or more observer methods that abstract from implementation details of the ADT. For example, an implementation (e.g., ADT) offers two methods, the first is a observer method called "GetPriceofItem( . . . )", and the second is a modifier method called "PurchaseItem ( . . . )". In this example, the observer method returns an internal property or state of an object (returns the price) without changing the state. Whereas, the modifier method changes state of the object (remove item from available inventory).

The described methods and systems use symbolic execution to infer a specification of the modifier method in terms of the observer methods. First, the technology executes the chosen modifier method starting from an arbitrary symbolic state. During symbolic execution, path constraints are collected on the use of the symbolic parameters and state, for a finite but possibly large number of paths. The path constraints arising during symbolic execution are in terms of the data structures of the implementation. Each path is also associated with a resulting symbolic state, and possibly a normal or exceptional result. Constraints, updates, or results obtained from symbolic execution are often complex and reflect the computation of the execution path. Exposing this much information to the user would often be overwhelming.

Second, for each previously explored path of the modifier method, the behaviors (observed state changes) of the chosen observer methods are explored in the respective initial and final symbolic state. Heuristics are used to map terms over implementation state into equivalent terms over observer methods. This yields many path-specific axioms in terms of the observer methods.

Third, these axioms are merged, simplified, as well as generalized. The result can be expressed as a traditional pre-/post-condition specification, ready to be used by a testing tool, and or as a specification in the form of parameterized unit test, which is often considered synonymous with writing a set of axioms. In any case, the resulting specification is often amazingly compact and resembles the best handwritten formalization for the method at hand.

The technology contributes the inference of formal specifications automatically, which can increase the acceptance of specifications. The technology introduces the symbolic execution of a modifier method to explore its behavior and then summarizing the results of the exploration using observer methods. This often results in concise, understandable specifications, which are a prerequisite for human analysis. Optionally, a generated specification is deemed sound and or complete. A specification is sound if the implementation conforms to the specification. It is complete if every behavior of the implementation that can be distinguished by observers is specified. The specifications are output as traditional pre-/post-condition specifications or as universally quantified conditional axioms, such as parameterized unit tests. The former often serve as inputs to a program verification system. The latter often provide inputs for tools that receive axioms in the form of parameterized unit tests, and generate test cases.

Example Method Generating a Specification from an Implementation

In one example, the software tool infers specifications from implementations in four steps or phases.

FIG. 1 is a flow chart of an exemplary method 100 generating a specification from an implementation.

At 102, receiving an implementation comprising a modifier method and an observer method.

At 104, symbolically executing the modifier method.

At 106, applying observer methods in constrained states to obtain specialized axioms.

At 108, create a specification from the obtained specialized axioms. For example, creating the specification from the specialized axioms comprises generalizing, merging and simplifying the axioms.

The resulting specifications can be examined by the user; they can also be used as input for a test tool. The specification can be output in a pre-condition, post-condition format, and or a parameterized unit test format. For example, a test tool can generate test cases from parameterized unit tests. Or, a specification serves as input to program verification systems requiring other specifications, such as pre-condition, post-condition specifications.

Example Computer System Generating Specifications

Figure 2:
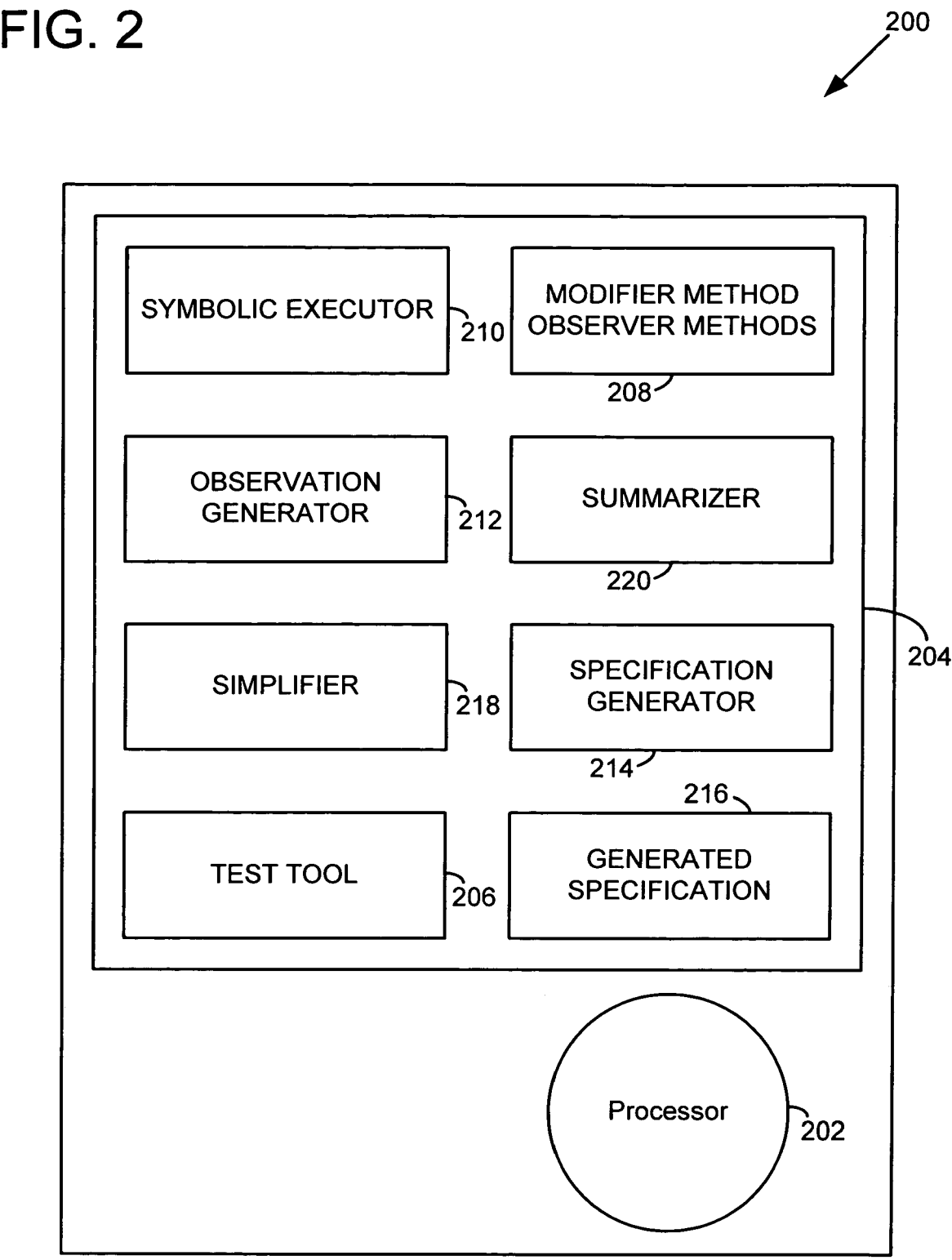
FIG. 2 is a block diagram of an exemplary system generating specifications from implementations.

FIG. 2 is a block diagram of an exemplary system generating specifications from implementations.

The system 200 comprises a digital processor 202, computer memory 204 with a test tool 206 facilitating several other software components including a modifier method and plural observer methods 208, a symbolic executor 210, an observation generator 212, and a specification generator 214. The symbolic executor receives the modifier method and returns modifier path conditions. The observation generator applies an observer method on states of a modifier path to obtain path specific axioms. The specification generator simplifies path specific axioms into general axioms, such as a specification 216. The specification generator may utilize other components such as a simplifier 218, and/or a summarizer 220. The computer memory typically includes other software components (not all shown) such as a constraint solver, a theorem prover, and a test case generator. Optionally, the system includes a graphical component (not shown) for receiving user inputs comprising an indication of at least one of the plural concrete values to replace with symbols. The graphical component generates on-screen choices such modifier and observer method selections. The functions of these various software components are described throughout this document, and drawings. Interestingly, these various components represent logical functions that can be combined or separated into various combinations of components.

Example Synthesis of Specifications

Figure 3:
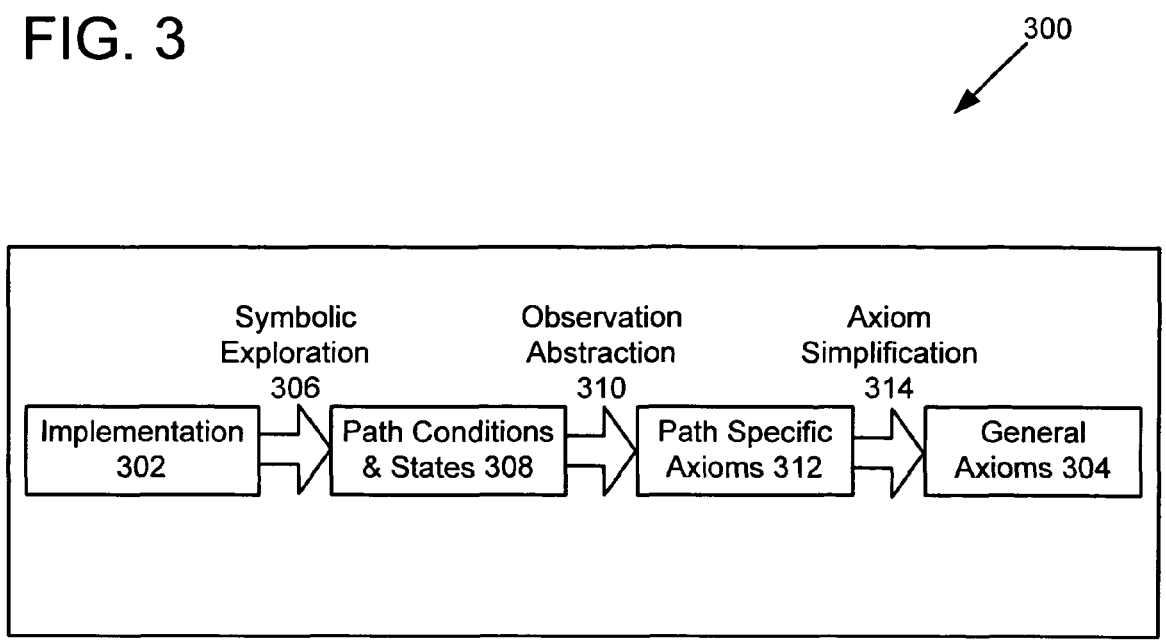
FIG. 3 is a flow chart of an exemplary process of synthesizing specifications from implementations.

FIG. 3 is a flow chart of an exemplary process of synthesizing specifications from implementations. The inputs (302) comprise an implementation of an ADT, a set of modifier methods of the ADT, for which specifications should be synthesized, and a set of observer methods per modifier method, and exploration bounds. An output (304) is a set of axioms.

The technique computes the axioms in three steps: it uses symbolic execution (306) to thoroughly explore the behaviors, such as path constraints (308) of the modifier method, it abstracts (310) the explored results into behavioral observations (312), and it simplifies and generalizes the result (314) using term rewriting.

The tool generates concise and comprehensive formal specifications from the implementation. Using the described technique, a specification was obtained for the Add method of the Hashtable class of the .NET BCL, as follows:

TABLE A

```
class Hashtable{
    void Add(object key, object value)
        requires key!= null;
        requires !this.ContainsKey(key);
        ensures this.ContainsKey(key);
        ensures value == this[key];
        ensures this.Count == old(this.Count)+1;
    }
}
```

In this example, the specification is a pre/post-condition Specification of the Normal (non-exceptional) Behavior for Hashtable.Add.

This specification can also be expressed as an axiom in the form of a parameterized unit test (PUT), which is useful as input to a various unit test case generation tools. As shown in Table B, a PUT expresses a universally quantified formula, in this case, an Axiom for Hashtable.Add.

Notice that the parameters of a PUT are the universally bound variables, the assume statements represent the precondition, and the assert statement is a postcondition. Clones can be used to preserve the original state of the target object. Other methods can be used for preserving state. In one example, results of observer method instantiations are recorded before invoking the modifier method. This provides before and after state information to observe modifier method behavior.

TABLE B

```
[TestAxiom]
    void Axiom(Hashtable me, object key, object
        value){Hashtable old =(Hashtable)me.Clone( );
    assume me!= null
        &&key!= null
        &&!me.ContainsKey(key);
    me.Add(key, value);
    assert me.ContainsKey(key)
        &&value == me[key]
        &&me.Count == old.Count +1;
}
```

Example Symbolic Execution

Given a modifier method, the technology symbolically executes the method starting from a symbolic state with symbolic parameter values. The initial symbolic state is truly unconstrained. It means for instance that not even the method's class invariant is guaranteed to hold. Similarly, the symbolic parameter values are unconstrained, e.g., the "this" argument is not guaranteed to be non-null. Initially, the path condition is true.

Instead of consuming and producing concrete values, computations are performed symbolically, e.g., the add operation applied on symbolic values a and b produces the term a+b. When a conditional control-flow branch is encountered, the current execution is potentially forked into two: One where the path condition is conjoined with the branch-condition, and one where it is conjoined with the negated branch-condition.

Executions with unsatisfiable path conditions are abandoned; this is checked with a constraint-solver or automatic theorem-prover. This way, symbolic execution provides a systematic way to explore all satisfiable execution paths of a program. Moreover, a path condition is accumulated along each path.

Table C shows some conjuncts of an unsimplified path condition of ArrayList.Add.

TABLE C

```
  this ≠ null
^ this._items ≠ null
^ this._size = this._items.Length
^ this._items.Length < this._size + 1
^ this._items.Length ≠ 0
^ 4 ≥ this._size + 1
^ 4 ≠ this._items.Length
^ 4 ≥ this._size
^ this._size ≤ 0
^ this._size ≥ 0 ^ this. size < 4
  ...
```

Example Observational Abstraction

The path conditions generated by the symbolic evaluation have two problems. First, they are very detailed. For example more than 180 paths are needed to determine the specification of the Hashtable.Add method, shown in Table B. Second, the path conditions are expressed in terms of the implementation. But users are not interested in such detailed conditions. Also these conditions hamper merging and simplifying different paths; for instance they often contain information about the concrete unrolling of loops of the implementation, which is completely irrelevant for any client of this code.

Observer methods describe the behavior of a modifier method from the outside, such as by providing an observed state change. Observer methods are projections of the implementation state, usually into more abstract values. A typical example of an observer method is ArrayList.Size which projects the ArrayList state to the size of the list, forgetting its contained elements and other details like the allocated capacity. Since an ADT can only be inspected through its (modifier and) observer methods, more detailed descriptions of an implementation's state are of no value to a client.

Observer Method Instantiation

It is desirable to find an observational abstraction for path conditions. Thus, observer methods are applied on different states, e.g., the initial or final state of the modifier method path. Additionally, the tool can explore paths under certain constraints, e.g., the previous path conditions, and, if the observer method has parameters, the tool can choose different argument values.

An observer method instantiation is a quadruple of (1) an observer method, (2) state, (3) constraints, and (4) argument values. In one example, the instantiations are chosen by an oracle. Additionally, instantiation strategies found to be successful are considered.

Finding Facts

For each observer method, a function symbol is introduced which allows building terms representing observer method instantiations. A fixpoint algorithm is used to compute a set of terms representing equations, called facts, and the fixpoint algorithm proceeds as follows:

1. Choose an observer method instantiation.
2. Use symbolic execution to explore the behavior of the observer method with certain bounds. This yields a set of execution paths. Consider only paths with normal results; each result is a term with respect to certain constraints. (Exceptional results are discussed later.)
   If there is a unique ground value that is a solution for all results, the fact that the observer method instantiation equals the ground value is added.
   If there is a unique result term, regardless of the constraints, the fact that the observer method instantiation equals the result term is added.
   Otherwise, do nothing.

When a fixpoint has been reached, the symmetric and transitive closure of the facts are built. Then, all tautologies (e.g., x=x) and facts which refer to state (i.e., the internal state of the implementation) are removed. Those remaining facts which refer only to observer method instantiation from the initial state are called likely preconditions, and all other remaining facts are called likely postconditions. The implication of pre- and postcondition is a likely observational abstraction of the path condition. Table D shows an observational abstraction of the path conditions in Table C.

Note that the above selection of facts is only an approximation. However, experiments show that this heuristic is effective in practice. Table D is an Axiom for ArrayList.Add.

TABLE D

```
[TestAxiom]
void Axiom(ArrayList me, object value) {
    ArrayList old = (ArrayList)me.Clone( );
    assume !old.Contains(value)
        &&old.Capacity = = old.Count
        &&old.Count == 0
        &&old.IndexOf(value) = = -1;
    me.Add(value);
    assert me.Contains(value)
        &&value = = me[old.Count]
        &&me.Capacity = = 4
        &&me.Count = = old.Count + 1
        &&me.IndexOf(value) = = 0;
}
```

Example of Choosing Observers

Choosing observer method instantiations for a particular modifier is a non trivial task.

Choosing Observer Methods

First, the observer methods themselves must be chosen. Intuitively, observer methods should be observationally pure, i.e., they should only change the state in such a way that the change is invisible to any client (see M. Barnett, D. A. Naumann, W. Schulte, and Q. Sun. 99.44% pure: Usefuil abstractions in specifications. In Proc. 6th Workshop on Formal Techniques for Java-like Programs, June 2004). They may, for instance, maintain a cache. Interestingly, this is not a formal requirement of our observational abstraction algorithm. It is however a requirement in order to represent the found abstractions as PUTs or traditional pre-/postconditions. Checking for observational purity is a non trivial data flow problem. It is assumed that the user provides observer functions that are observationally pure.

Many observer methods are redundant, e.g., the IsEmpty property can be expressed using the Size property, Contains can be expressed via an indexer and all of those can be expressed by inspecting the result of an enumerator. Choosing a minimal set of observers is necessary, otherwise the generated axiom would be overwhelming in redundancy. Instead, the described technology provides user designation of a modifier and its observation methods. In one example, an on-screen graphical display reviews the implementation and displays the available modifier and observer methods. The user selects a modifier method, and one or more observer methods.

Choosing the State and Constraints

Recall that observer method instantiations are selected relative to an explored path of the modifier method. This gives rise to two states on which to apply observer methods: The initial state and the final state of the path. For the exploration of the modifier method, the initial state was truely unconstrained. But exploring observer methods from an unconstrained state would enumerate many paths which are unrelated to the chosen path of the modifier method; this is unnecessary.

Instead, an unconventional exploration process is adopted: The tool projects the given path condition of the modifier method back onto the initial state, and these projected constraints are chosen for the observer method instantiations. Thus, the exploration of the observer method from the initial state will already be restricted by the constraints induced by the particular behavior of the modifier.

Choosing Arguments for Observer Method Instantiations

A naive argument selection strategy could simply choose fresh symbolic values. However, this will incur too many irrelevant results. Consider the modifier method Hashtable.Add(key, value). Exploring ContainsKey(key'), where key' is unrelated to key, is pointless. Therefore, only the initial symbolic parameter values are used and any derived results of the modifier and observer method instantiations.

Of course, only values which match a parameter's type are used to instantiate it. But this still results in too many irrelevant results. Consider the invocation Hash-table.Add(key, value) again. The two parameters have object types. ContainsKey and ContainsValue also take an object parameter. However, the exploration of Contains-Key(value) is useless and should be avoided.

To address this problem, the notion of a group is introduced. A group captures dependencies that go beyond dependencies induced by the type system. The user assigns a group to each formal parameter and result of each modifier and observer method. For instance, for the running example Hashtable.Add he would assign the key and value parameter to the KEY and VALUE group, respectively; likewise the user would assign KEY to the parameter of the indexer observer and VALUE to the indexer's result. This is a first approximation to relate the corresponding parameters and results of modifier and observer methods. During the application of the algorithm, a dependency relation between terms and groups is built up. Initially, ground values are related to all type-compatible groups, and the chosen symbolic parameter values of the modifier method are related to their respective groups. Every time a term as the result of a modifier or observer method instantiation is observed, a dependency from the term to the formal result group of the method is introduced. A term is used as an actual argument of an observer method instantiation when it depends on the formal parameter's group.

As of today the user provides the initial group information via custom attributes, however grouping information can also be inferred using a simple data-flow analysis.

With grouping information, observer method instantiations are constructed with appropriate arguments. But there are still too many instantiations. Consider the directed graph where each node represents a group, and edge from group A to group B exists if there is an observer method which takes a parameter of group A and its result is in group B. If this graph is cyclic, it could be possible to derive an infinite number of instantiations. This problem is avoided by unrolling cycles only a finite number of times, which results in a finite nesting of observer terms.

Using these strategies, the tool constructs less convoluted but still comprehensive observers for the considered ADTs.

Example Merging and Simplifying Axioms

In most cases, exploring a modifier method using symbolic execution produces multiple paths. For each path, a path specific axiom is generated. A user, however, does not want to investigate hundreds of axioms (see e.g., Table K), but prefers a compact description of the behavior. Thus the generated axioms need to be collapsed to achieve more general results. So, as the final step, the paths are merged in the following order. The steps compute the conjunctions of implications. So the order between step 1 and 3 is not strict and can be changed to get equivalent axioms in different representations:

1. Disjoin pre-conditions with the same post-conditions
2. Simplify merged pre-conditions
3. Conjoin post-conditions with the same pre-conditions
4. Simplify merged post-conditions If a modifier contains a loop, it is often not possible to explore all paths of the modifier. That is why loops are only unrolled a certain number of times. In most experiments, unrolling the loops three times is enough to get sufficient knowledge about the modifiers and often reaches full branch coverage.

However, loop unrolling introduces concrete values instead of symbolic values into the axioms. Table E shows such an example ungeneralized axiom generated for ArrayList.Remove.

In this example, the return value of IndexOf and the upper bound of Count are concrete values caused by loop unrolling.

TABLE E

```
[TestAxiom]
void Axiom(ArrayList me, object value){
    ArrayList old = (ArrayList)me.Clone( );
    assume old.Contains(obj)&&old.IndexOf(obj) = = 0
        &&old.Count = = 1 &&old.Capacity > 0)
        ||old.Contains(obj)&&old.IndexOf(obj) = = 1
        &&old.Count > 0&&old.Count < 3
        &&old.Count < old.Capacity +1
        ||old.Contains(obj)&&old.IndexOf(obj) = = 2
        &&old.Count > 0&&old.Count < 4
        &&old.Count < old.Capacity +1;
    me.Remove(obj);
```

TABLE E-continued

```
        assert !me.Contains(obj)
              &&old.Capacity = = me.Capacity
              &&me.Count = = old.Count – 1
              &&me.IndexOf(obj) = = –1;
```

Concrete values can be eliminated from axioms by generalizing the formulae. Currently, relationships are generalized among variables that can be expressed as linear integer constraints. Generalization happens before merging all the paths. Table F gives the generalized axiom for Table E. The generalized axiom is easy to understand: if the object to be removed from the list can only be found at the end of the list, after the removal, the list will not contain the object any longer.

Example Unsound Axioms

Generating axioms has its limitations. Here, the problem of insufficient observers is considered.

TABLE F

```
    [TestAxiom]
    void Axiom(ArrayList me, object value){
        ArrayList old = (ArrayList)me.Clone( );
        assume old.Contains(obj)&&old.Capacity > 0
              &&old.Count > 0
              &&old.Count < old.IndexOf (obj)+ 2;
        me.Remove(obj);
        assert !me.Contains(obj)
              &&old.Capacity = = me.Capacity
              &&me.Count = = old.Count – 1
              &&me.IndexOf(obj) = = –1;
    }
```

In one example, the tool was applied to a code base currently under development. In that example, an unexpected unsound axiom for the method XElement.RemoveAttribute, was generated as shown in Table G.

TABLE G

```
    [TestAxiom]
    void Axiom(XElement me, XAttribute a){
        XElement old = (XElement)me.Clone( );
        assume old.HasAttributes( )&&a!= null;
        me.RemoveAttribute(a);
        assert false;
    }
```

Obviously, this axiom is corrupted since its post-condition is supposed to be false. It is caused by the insufficiency of provided observer methods. For some paths, RemoveAttribute assumes that the element contains only one attribute, then after removal, HasAttributes will be false, while for other paths, it assumes that the element contains more than one attributes, which makes HasAttributes true. The existing observers cannot distinguish these two cases, resulting in that for the same pre-conditions, there are two contradictory post-conditions. The described summarization process thus produces warnings when the tool tries to conjoin two contradictory post-conditions from two paths with identical pre-conditions. Currently the warning simply displays the contradictory predicates.

Missing observers can easily be added with the information from the warning. For instance assume that an additional observation method is added, here called Has-MoreThanOneAttr to the XElement class. The tool then obtains two axioms as shown in Table H, that correctly describe the method.

In addition to observers already implemented in the observed classes, the tool also provides support for user-defined external observers. User-defined external observers can help the tool to characterize a path in a more accurate way and thus obtain better axioms in at least two respects. First, some user-defined observations of common properties are important for most interesting cases, e.g., if a value is null. Second, a user-defined observer can be used to overcome the intrinsic limitations shown in Table G, as overcome in Table H by observing a user indicated property.

TABLE H

```
    [TestAxiom]
    void Axiom1(XElement me, XAttribute a) {
        XElement old = (XElement)me.Clone( );
        assume old.HasAttributes( )
              &&me.HasMoreThanOneAttr( )&&a!= null;
        me.RemoveAttribute(a);
        assert me.HasAttributes( );
    }
    [TestAxiom]
    void Axiom2(XElement me, XAttribute a) {
        XElement old = (XElement)me.Clone( );
        assume old.HasAttributes( )
              &&!me.HasMoreThanOneAttr( )&&a!= null;
        me.RemoveAttribute(a);
        assert !me.HasAttributes( );
    }
```

Example Axioms for Exceptional Behaviors

The described technology, as embodied in the described tool also supports inferring axioms for exceptional behaviors (exceptions). Obviously, a terminating explored path of the modifier can have an exceptional result. In one example, two kinds of exceptions are considered. Exceptions thrown by either the execution engine or by methods declared in classes other than the class of the explored method, indicate that the path violates a precondition of an instruction (like ArrayIndexOutOfBoundsException) or of a called method. Since this should never happen in correct code, it is an indication that this path will never arise by concrete method call sequences. Often, this means that the path is only satisfiable when an invariant is violated. In any case, the tool ignores such a path.

If an application-level exception is thrown (such as ArgumentOutOfBoundsException), this is considered a form of normal behavior. The only difference is that a special observer, namely one that catches the thrown exception type, is applied in the final state.

For instance, the Add method of the Hashtable class throws an exception if the provided key is null or if the non-null key is already in the hash table. Table I shows the generated axioms. The ExpectedException attribute describes the mandatory exception. Combined with the axioms in Table B, a comprehensive specification of Hashtable.Add is achieved.

Note that the state of the ADT might have changed when the exception is thrown. However, so far all APIs encountered throw user defined exceptions only as part of parameter validation.

Exceptional behavior can also occur during the subsequent exploration of observer methods. Such behavior can be ignored, since it is assumed that execution-engine exceptions indicate likely invariant violations.

TABLE I

```
[TestAxiom,
ExpectedException(
    typeof(ArgumentNullException))]
void Axiom3(Hashtable me, object key, object value) {
    assume me!= null &&key = = null
    me.Add(key, value);
}[
TestAxiom,
ExpectedException(
typeof (ArgumentException))]
void Axiom4(Hashtable me, object key, object value){
    assume me!= null &&key!= null
    &&ContainsKey(key);
    me.Add(key, value);
}
```

Example Theory

In this section, a formal framework is introduced to study soundness and completeness of the inferred axioms.

First, basic notions are defined to reason about symbolic execution. However, to aid in the flow of the discussion, some concepts are provided below such as "Example Symbolic Execution" and "Example Parameterized Unit Tests".

Definition 1. Fix a set of locations L and a set of symbolic values V. A symbolic state S is a total mapping of L to terms over V. A constraint C is a predicate over V.

Definition 2. A constraint C is satisfiable, if there exists an interpretation of V that is a model for C. A constrained state is a pair (S, C). A pair (S, C) is feasible if C is satisfiable.

Intuitively, a feasible constrained state represents a non-empty set of concrete states. Next, transitions over constrained states are defined.

Definition 3. A conditional transition $\tau$ is a pair $(\Gamma, \Delta)$, where is $\Gamma$ is an enabling condition and $\Delta$ is a function which maps a symbolic state to an (updated) symbolic state.

Intuitively, every conditional transition $\tau$ here corresponds to a particular terminating execution path of a method. $\Gamma$ is the path condition governing this execution, while $\Delta$ gives the updates on the state.

Definition 4. A step function + is defined such that $(S, C)+(\Gamma, \Delta)=(\Delta(S), C\hat{}\Gamma)$ iff $C\hat{}\Gamma$ is satisfiable, where (S, C) ranges over constrained states, and $(\Gamma, \Delta)$ over conditional transitions.

The behaviors of a method can be seen as the set of its execution paths. All execution paths have disjoint path conditions.

Definition 5. A set a of conditional transitions is an action iff for every two not identical $(\Delta, \Gamma), (\Delta', \Gamma') \in a$ a holds $\Gamma\hat{}\Gamma'$ is unsatisfiable.

A program with inputs (i.e., symbolic values in the initial state) can have many runs.

Definition 6. A program is defined by the tuple $(S_0, C_0, A)$ where $(S_0, C_0)$ is a feasible constrained state, and A a set of actions. A finite run of a program is a sequence of conditional transitions $\tau_0, \tau_1, \ldots, \tau_n \in \cup A$, such that $(S_0, C_0)+\tau_0+\tau_1+\ldots+\tau_n$ is defined.

Only certain constrained states can be reached from the initial state.

Definition 7. Let $(S_0, C_0, A)$ be a program. A constrained state (S,C) is reachable iff there exists a finite run $\tau_0, \tau_1, \ldots, \tau_n \in \cup A$, such that $(S_0, C_0)+\tau_0+\tau_1+\ldots+\tau_n=(S,C)$.

Next, the notion of reachability is extended to transitions.

Definition 8. Let $\alpha \in A$ be an action. Then, $$(S, C) \xrightarrow{\tau} (S', C')$$

is a reachable transition of $\alpha$ iff there exists a reachable constrained state (S,C), $\tau \in \alpha$ and (S,C)+$\tau$=(S', C').

A program is fixed for the remainder of this section.

With these definitions, it becomes clear that each axiom of concern had the following form, $$\forall S,C,S',C'.p(S,C) \Rightarrow q(S,C,S',C')$$

where p represents the precondition of some modifier method, and q the postcondition. W.l.o.g. the parameter values are assumed to be stored in locations of the state.

Definition 9. An axiom $\lambda$ is a pair (p, q), where p is a predicate over symbolic states, and q a relation over symbolic states.

Soundness and completeness of axioms is characterized by relating them to all reachable transitions.

Definition 10 (Sound). An axiom $\lambda=(p, q)$ is sound regarding an action $\alpha$ iff for every reachable transition $$(S, C) \xrightarrow{\tau} (S', C'),$$

$\tau \in \alpha$, it holds that $p(S,C) \Rightarrow q(S,C,S',S')$.

Definition 11 (Complete). A set of axioms A is complete for an action $\alpha$ iff for every reachable transition $$(S, C) \xrightarrow{\tau} (S', C'),$$

$\tau \in \alpha$, there exists an axiom $(p,q) \in \Lambda$ such that p(S,C) holds.

Previously, observers were inspecting certain properties of the constrained state. Let D be a set. Intuitively, this is the set of all possible ground values that all observer methods can ever return.

Definition 12. An observer $\pi$ is projection function which maps constrained states into $2^D$, such that
    $\pi(S,C) \neq $null, iff C is satisfiable, and
    $\pi(S,C) \cap \pi(S,D) = \pi(S,C\hat{}D)$.

W.l.o.g. only a single observer is considered in the following. An observer is sufficiently complete to distinguish the different behaviors of an action, if the observer exhibits the difference in behavior. Formally:

Definition 13 (Sufficiently Complete). An observer $\pi$ is sufficiently complete for an action $\alpha$, if for all $(\Gamma, \Delta), (\Gamma', \Delta') \in \alpha$ and for all constrained states (S,C) the following holds.

$$\pi(S,C\hat{}\Gamma) \cap \pi(S,C\hat{}\Gamma') \Rightarrow \pi(\Delta(S),C\hat{}\Gamma) \cap \pi(\Delta'(S),C\hat{}\Gamma')$$

The technique generates axioms by expressing execution paths of a method in terms of observers.

Definition 14. Let $\alpha$ be an action, $\tau=(\Gamma, \Delta) \in \alpha$, and $\pi$ an observer. $\lambda_{\tau,\pi}=(p, q)$ is the axiom for $\tau$ under $\pi$, where
    p(S,C) iff $\pi(S,C\hat{}\Gamma) \neq $null, and
    q(S,C,S',C') iff $\pi(S',C') \cap \pi(\Delta(S), C\hat{}\Gamma)$ It is said that $\Lambda_{\alpha,\pi}=\cup_{\tau \in \alpha}$ are the axioms of $\alpha$ under $\pi$.

The following theorems can now be formulated:

Theorem 1 (Completeness of Generated Axioms). Let π be an observer, and α an action. $\Lambda_{\alpha,\pi}$ is complete.

This follows directly from the first requirement of π and the definition of the preconditions of the axioms in $\Lambda_\pi$.

Theorem 2 (Soundness of Generated Axioms). Let π be an observer, and α an action. $\Lambda_{\alpha,\pi}$ is sound if π is sufficiently complete for α.

Proof 1. Let π be an observer, α an action such that π is sufficiently complete for α. Let τ=(Γ, Δ)∈α. Let $$(S, C) \xrightarrow{\tau} (S', C')$$

be a reachable transition. Let $(p,q)=\lambda_{\tau',\pi} \in \Lambda_{\alpha,\tau}$ be an axiom for some τ'=(Γ', Δ')∉α. Assume p(S,C) holds, i.e. π(S,C^Γ')≠ null.

Case 1: τ=$\tau_1$. Then q(S,C,S',C') holds because, null≠π(S', C')=π(Δ'(S), C^Γ').

Case 2: τ≠τ'. Then, because τ, τ' ∈ α, Γ^Γ' is unsatisfiable. Therefore, by the properties of π, we have, null=π(S,C^Γ^Γ')= π(S,C^Γ')∩π(S, C ^ Γ'). q(S,C,S',C') holds by the sufficient completeness of π.

Note that all previous definitions were with respect to a finite set of runs.

Improvements on Described Tool

As might be expected, the present implementation doe not always achieve completeness since it does not consider all possible observations, which leads to an underapproximation of the observer projection π. Second, if the chosen observers are not sufficiently complete, this leads to unsound axioms. Third, the theorem prover employed by the tool is not complete.

Redundancy

Redundancy may cause axioms to contain observations which are subsumed by other observations, i.e., the axioms are "bigger" than necessary. However, redundancy does not affect soundness or completeness of the axioms. In fact, sometimes redundant observers can even help in program understanding.

Insufficient Completeness of Observers

Sometimes not all conditions of a path condition of the modifier method are captured by the chosen observer method instantiations. If two axioms have the same precondition but contradictory postconditions, then the generated axioms are not sound. This can be avoided by providing more observation methods in the class implementation or by user-defined observers. Not that insufficient completeness will inherently arise from flawed designs, where the enabledness of an implementation method depends on hidden state.

Exemplary Observations

The previously sketched algorithm considers only an exemplary subset of execution paths and observer method instantiations. Optionally, the observation results could be captured on the level of the program state, and this would obtain sound axioms by construction. But since the current implementation abstract away program state, and instead collects facts that can be detected by the observer methods, this information is not maintained. In particular, the symbolic exploration technique considers a certain number of loop unrollings, but the axioms in terms of the observer methods often abstract from that number, pretending that the number of loop unrollings is irrelevant. In fact, if an infinite number of loop unrollings is feasible, all cases can not be considered without knowledge of summaries of the loop, i.e., the loop invariants. Note that this problem is aggravated by the generalization technique, which is presented later.

Reachability

Some axioms generated from unconstrained symbolic states might have preconditions which are not enabled in any reachable state.

For example, for the .NET ArrayList implementation the number of elements in the array list is at most its capacity; a state where the capacity is negative or smaller than the number of contained elements is unreachable. Exploring a modifier like Add from an unreachable state may produce axioms which depict behaviors that never happen in real contexts. These axioms do not pose a problem in theory. But in reality, the problem of insufficient observers might arise because reachability is usually not an observable property. This might lead to unsound axioms.

Fortunately, experiments show that this is not a problem. Exploration from unreachable states often results in violations of contracts with the execution environment, e.g., null-pointer-dereferences. As has been explained earlier, those cases are pruned automatically.

Missing Invariants

Computing reachability is a hard problem. A good approximation of reachable states are states in which a class-invariant holds. The class invariant can be written as a Boolean-valued observer method. It is treated in a special way by this technique: If the invariant does not hold in a state, it is pruned.

Deciding Satisfiability

There is a intrinsic limitation of any automatic verification technique of non-trivial programs: there cannot be an automatic theorem prover for all domains. Currently, the exploration is conservative for the symbolic exploration: if the satisfiability of a path condition cannot be decided, symbolic execution proceeds speculatively. Therefore, infeasible paths might be explored. The consequences for the generated axioms are similar to the ones for unreachable, not pruned states.

Reality Check

The discussed limitations seem restrictive. But experience shows that the claims of Theorems 1 and 2 holds for well-designed ADTs. Except for limitations of employed automatic theorem provers, the user can approach full completeness and soundness by just providing more observers.

Example Tool

Axiom Meister is an implementation to infer axioms for given classes written in any .NET programming language. Its design follows the concepts introduced earlier.

Figure 4:
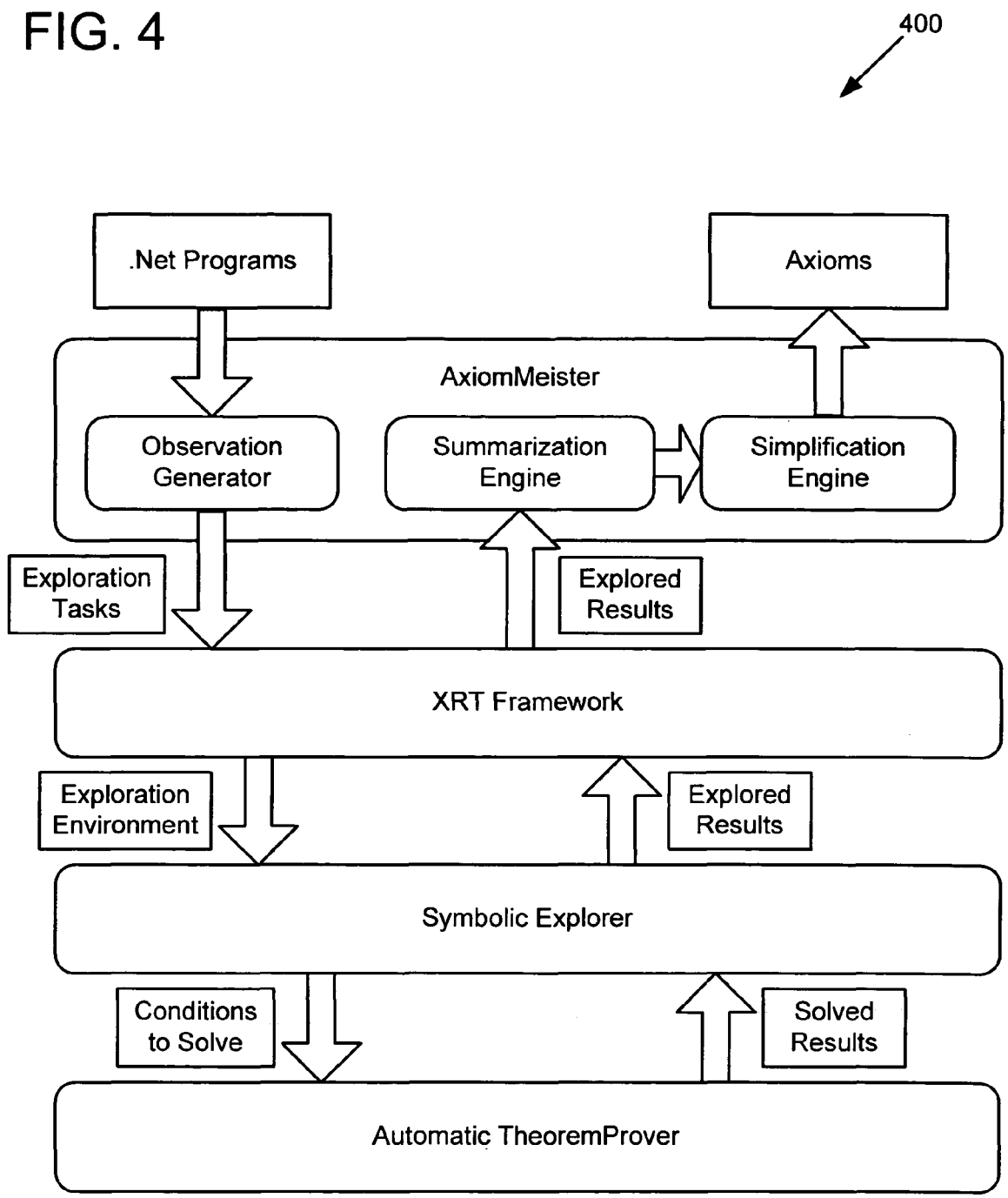
FIG. 4 is a block diagram of an exemplary computing environment for generating a specification from an implementation.

FIG. 4 is a block diagram of an exemplary computing environment for implementing the described technology. For example, the diagram 400 gives an overview of Axiom Meister's tool architecture.

Axiom Meister is build on top of XRT, which is a customizable model checker for programs written, or better said—compiled to—the Common Intermediate Language (CIL). XRT can capture the interpreted program's state, and allows exploration to proceed from any captured state. This allows it to efficiently explore different execution paths. XRT can also use symbolic values for value and reference types and operations can be performed over symbolic values. This allows symbolic execution. When using symbolic state, the background of the theorem prover is populated with constraints about the semantics of certain operations; the type system of the given program, for instance, is encoded as a partial order over type names.

Related to Axiom Meister is Unit Meister (not shown). Unit Meister is a unit test program that takes Axiom Meisters output (e.g., PUT) and generates for these specifications a minimal number of unit tests, one for each explored path.

Axiom Meister consists of three components: the observation generator, the summarization engine and the simplification engine.

The observation generator manages the exploration process. It produces exploration tasks for modifiers. Specifically, it generates the fully symbolic initial state and passes the state with the modifier to the XRTframework. Every time the exploration of a modifier reaches a termination state (normal or exceptional exits), it collects the path conditions and integrates them into the initial state. Exploration tasks for observers are created from the final state of an explored path and the modified initial state.

Exploration is not guaranteed to terminate; that is why Axiom Meister currently provides two ways to control the exploration. First, the user can control the number of loop unrollings. Second, the user can restrict the maximum number of terminating paths. By default, Axiom Meister will terminate the exploration when every loop has been unrolled three times, which often provides a full branch coverage for the modifier. And so it has never needed more than 600 terminating paths for the analyzed modifier to create axioms for BCL classes.

When all the observers are explored, the summarization engine collects the explored results and tries to summarize the axiom for this particular explored path, after discarding all the observers that return more than one result. Exceptional axioms are simpler to summarize than normal axioms, because their post-conditions only need to state the type of exceptions to throw.

Next all generated axioms are passed to the simplification engine, which implements the loop generalization and the axiom simplification algorithms. Currently, only linear integer expressions are supported in the simplification engines for both generalizing loop unrolling and simplifying conditions. The simplification engine is currently written in Maude (see http://maude.cs.uiuc.edu).

Presently, Axiom Meister can generate the final output as a parameterized unit test or as the Spec# specification.

Axiom Meister is a batch tool. But a graphical user interface for Axiom Meister is currently under development.

Figure 5:
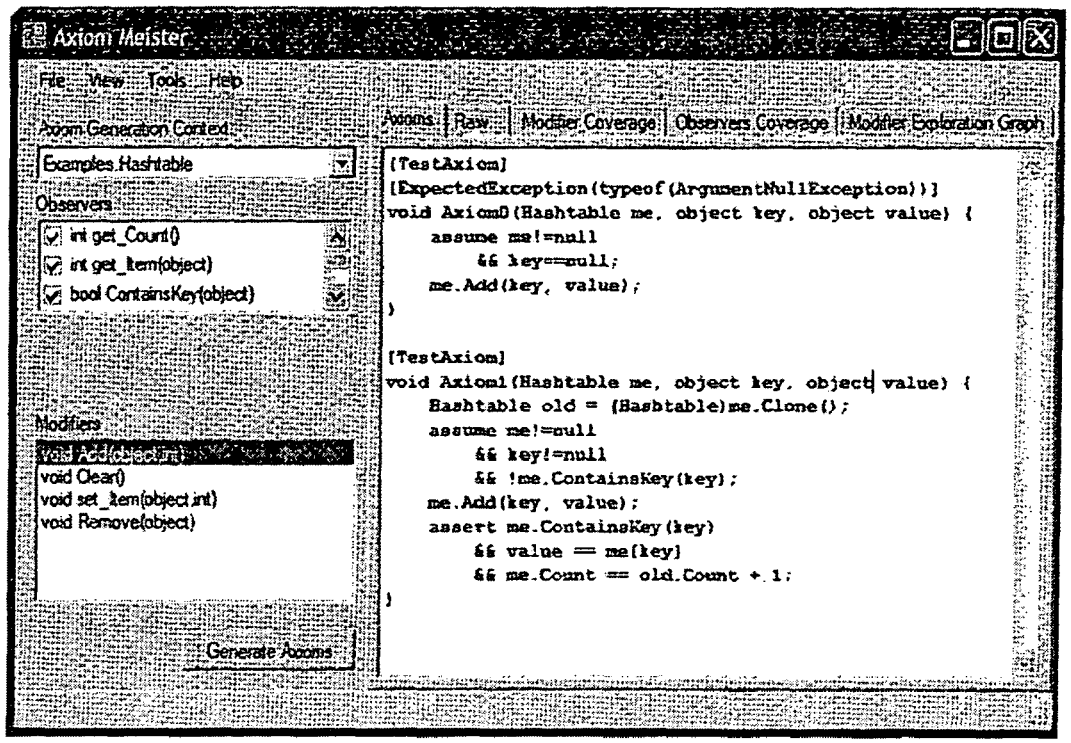
FIG. 5 is a diagram of a exemplary graphical user interface for an selecting an observer method and a modifier method.

FIG. 5 is a diagram of a exemplary graphical user interface for one implementation of the tool. In this example, the user can choose the modifier method 502 to explore, which is Hashtable.Add in this example, and corresponding observer methods 504 for axiom inference on the left panel. The generated axioms are then shown in the right window. It also shows other information about the axiom inference, e.g., the code coverage of the modifier method and observer methods.

Example Empirical Results

The Axiom Meister was applied to a number of non-trivial classes, including a few production BCL classes, some classes from the public domain, as well as classes that are currently under development by a Microsoft product group.

Table J gives some example classes along with the numbers of modifiers and observers chosen for inferring axioms. The LOC column gives the number of lines of non-whitespace, non-comment code. Stack, ArrayList and Hashtable are taken from the BCL; BoundedStackis a modified version of Stack, which has a bounded size; LinkedList implements a double linked list with a similar interface as ArrayList; XElement is a class of a refined document object model (DOM) model, which is currently under development. All implementations are unchanged, except for the Hashtable: the test fixed the initial value of the internal variable bucketLength to improve the performance due to limitations of the used theorem prover.

TABLE J

| Class | Modifiers | Oberservers | LOC | Source |
|---|---|---|---|---|
| Stack | 3 | 3 | 200 | .NET BCL |
| BoundedStack | 2 | 4 | 160 | Other |
| ArrayList | 7 | 6 | 350 | .NET BCL |
| LinkedList | 6 | 4 | 400 | Other |
| Hashtable | 5 | 4 | 600 | .NET BCL |
| XElement | 2 | 3 | 800 | MS internal |

In addition to existing observers of the respective classes, an external observation method is used, which checks to see if return values and input arguments are null.

Table K gives the evaluation results of these examples. The first two columns show the number of explored paths and the time cost to infer axioms for multiple modifiers of the class. Both measurements are obviously related to the termination criteria of the symbolic exploration. As mentioned before, the exploration is set to terminate when every loop is unrolled three times, which in most cases provides full branch coverage. The last three columns illustrate the number of generated axioms, the number of sound axioms, and the number of modifiers whose behaviors are completely covered by the inferred axioms, as discussed.

TABLE K

| Class | Paths | Time(s) | Axioms | Sound | Complete |
|---|---|---|---|---|---|
| Stack | 7 | 1.78 | 6 | 6 | 3 |
| BoundedStack | 17 | 0.84 | 12 | 12 | 2 |
| ArrayList | 142 | 28.78 | 26 | 26 | 7 |
| LinkedList | 59 | 9.28 | 16 | 13 | 6 |
| Hashtable | 835 | 276.48 | 14 | 14 | 5 |
| XElement | 42 | 2.76 | 14 | 13 | 2 |

Soundness and completeness of inferred axioms currently must be examined manually. An interesting observation is that most BCL classes, are comparatively more self-contained and reusable then classes which are currently under development. Or in more technical terms: BCL classes provide sufficient observers whereas new classes, like XElement, do not. In these examples the generated axioms are complete. However, some are unsound: three for LinkedList and one for XElement. Those unsound axioms for LinkedList are caused by a missing class invariant. After adding a strong class invariant, the tool infers sound axioms only.

Example Theories of Axioms

The described technology provides a theory used to reason about completeness and soundness of the generated axioms. The provided technology provides preprocessing that leverages existing theorem provers and or constraint solvers, and thus will become even more powerful and useful as theorem provers and constraint solvers evolve. And, a test user can approach full completeness and soundness by providing more observers, as described.

Example Parameterized Unit Tests

Parameterized unit tests extend the current industry practice of closed unit tests. A parameterized unit test is a test with input parameters, a series of program statements, and one or more assertions verifying program behavior. One purpose of a parameterized unit test is to specify the external behavior for various values assigned to the parameters. In one example, the described technologies automate the creation of parameterized unit tests from an implementation. For example, concrete values and or objects in the body of the traditional unit test are replaced with symbols, and the symbols are exported to the parameterized unit test signature. Once created, the parameterized unit test can be used as an input to symbolic execution. Symbolic execution provides path constraints that are used in automated test case generation. Once test cases are generated, they serve as input parameters to the parameters of the parameterized unit test, thereby verifying program behavior.

For example, a specific test can be obtained (e.g., a previous closed unit test can be re-obtained) by instantiating the parameterized unit test with specific input parameters. Separation of parameterized unit tests from specific test cases supports many benefits including automated test case generation. Symbolic execution assigns symbolic input variables to parameters of a parameterized unit test. Possible path constraints of an implementation under test (IUT) are identified during symbolic execution. In one example, a graph is created that identifies constraints that must be satisfied to travel a path through a graph of states of the IUT. A constraint solver automatically generates test cases (e.g., value assignments to the input parameters of the parameterized unit test) by determining the test inputs that satisfy the constraints of an execution path through the IUT.

Additionally, symbolic execution is supported for object-oriented programs. The described object-oriented symbolic execution technology allows a parameterized unit test to include an arbitrary number of classes, plural instantiations of each class, and multiple assignments to fields within objects. A path through a graph of constraints determines possible concrete parameter assignments. An automated constraint solver and/or theorem prover automatically selects a minimal set of inputs that exercise possible code paths through an implementation.

Context for the Discussion

Although not limited as such, the technology is described in the context of parameterized unit tests, symbolic execution, and object-oriented programs (U.S. patent application Ser. No. 11/197,912, "Symbolic Execution of Object Oriented Programs with Axiomatic Summaries", filed Aug. 4, 2005, which is incorporated herein by reference thereto).

Example Tests and Implementations

Figure 6:
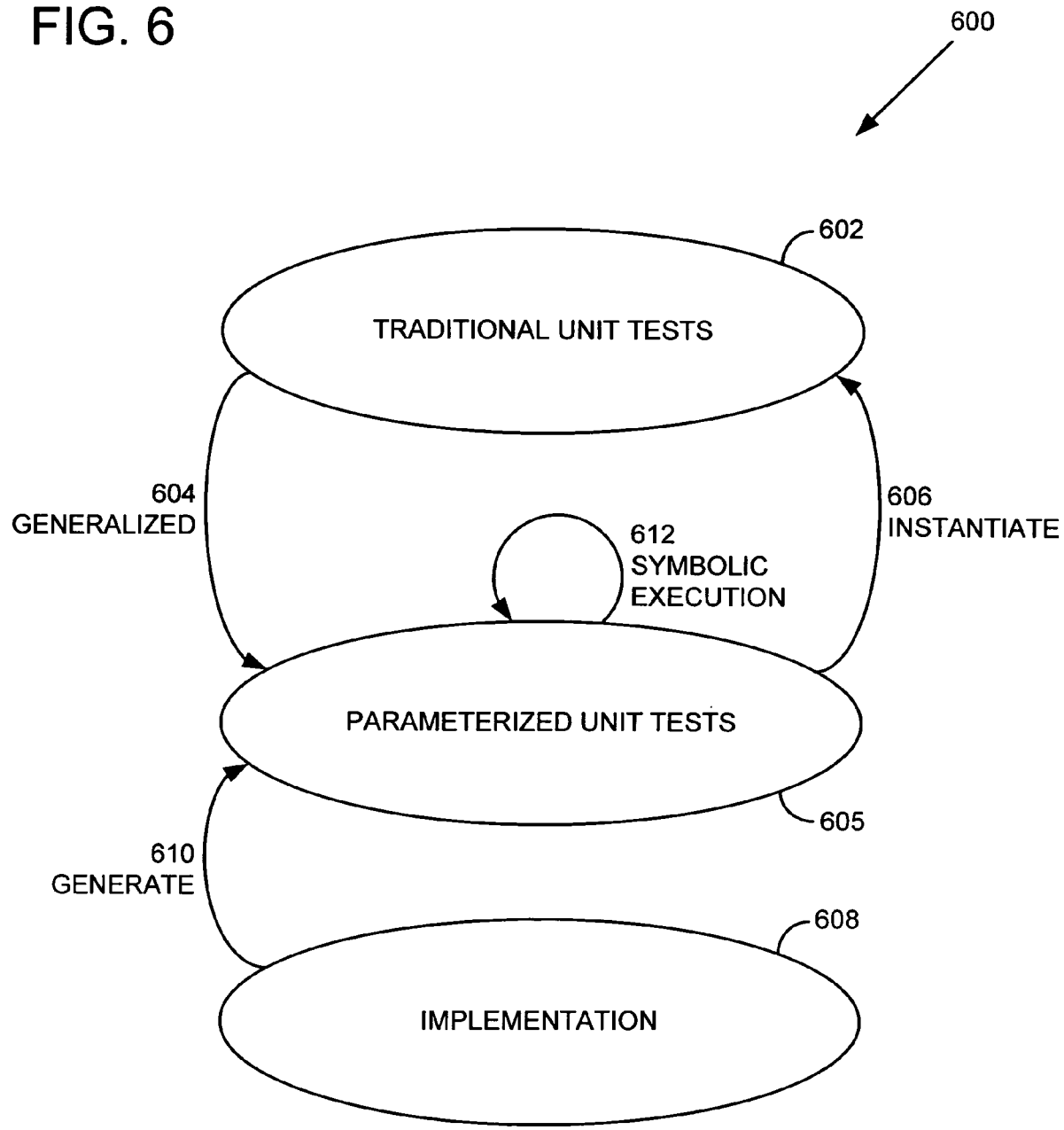
FIG. 6 is a diagram illustrating exemplary relationships between traditional unit tests and parameterized unit tests.

FIG. 6 is a diagram 600 illustrating relationships between traditional unit tests, parameterized unit tests, and implementations. For example, a traditional unit test (TUT) 602 has no input parameters in the unit test call signature, but instantiates one or more objects within the body of the test. The TUT verifies expected behavior after one or more calls to the instantiated object is made within the test body. The call within the body of the TUT is made with a set of one or more concrete input parameters as provided in source code by a programmer writing the TUT source code. Thus, a TUT exercises a single test path through one or more objects based upon the programmer provided input parameters.

A parameterized unit test (PUT) 605 exposes input parameters that can be instantiated with plural different concrete values in the exposed test call input parameters. For example a PUT call may exercise a path through one or more objects, and plural calls to a PUT may exercise plural paths through one or more objects. For example, different inputs (or PUT instantiations) may exercise different paths through an object, based upon the test call parameters. Thus, plural PUT calls with various input parameters are useful in verifying plural program behaviors without manually writing separate TUTs for each test. Thus, parameterized unit tests provide the possibility of exercising a program (e.g., instantiating the parameterized unit test) with various input parameters to explore or test program behavior that would otherwise require plural individually programmed traditional unit tests.

In one example, traditional unit tests serve as inputs to a method that generalizes 604 the traditional unit tests (TUT). The exemplary method generalizes 604 the TUT thereby creating a PUT 605.

In another example, a PUT is instantiated with symbolic variables as PUT inputs. These symbolic inputs can be symbols replacing concrete values (e.g., integers, Boolean, string, etc.) or symbols replacing objects. In several examples, symbols replacing objects are supported by mock objects. In one example, these symbols are exported to call signature of the test. This symbols as inputs are said to symbolically instantiated the PUT, and the symbolically instantiated PUT is symbolically executed to obtain relationships on symbolic inputs. In one such example, a mock object is created and that mock object is placed in the call to the symbolically instantiated PUT (along with other input symbolic values).

The symbolically instantiated PUT is symbolically executed to determine plural paths through an object. Relationships on symbolic inputs are discovered during symbolic execution. For example, during symbolic execution, one or more relationships are discovered based on branch tests through paths of an object or implementation. In one such example, during symbolic execution of an object under test within a PUT, a branch test within the object provides a relationship within the object code (e.g., if (X>10) call firstMethod, else call secondMethod). This relationship discovered during symbolic execution of the object helps identify PUT instantiation inputs (e.g., Test (X), where X=11, 10) that exercise various paths through the object. In this example, symbolic execution discovers two paths for testing exploration (e.g., input X>10, and input X≦10). Thus, relationships on symbolic inputs are explored during symbolic execution in order to discover concrete inputs to a PUT. The PUT is called with the discovered concrete inputs to exercise paths through an object under test.

Discovered inputs that exercise path coverage through an object can also be used to automatically create code for TUTs 606. Thus, a PUT instantiated with concrete values is similar to a TUT, except that the concrete values are delivered to the PUT via the input parameters.

Thus, there is potentially a circular nature to the relationships between TUTs 602 and PUTs 605. Under that view, a TUT is generalized 604 to create a PUT. A PUT is symbolically executed 612 to discover concrete input values through an object or implementation under test. And a PUT is instantiated 606 with the discovered concrete values to exercise the object or implementation under test. Of course, the TUT itself is not necessarily needed once the PUT is created, since the PUT itself can be instantiated with the concrete values via its input parameterized.

In one example, in order to generalize 604 a TUT, a method removes one or more concrete values from the body of the TUT and replaces those concrete values with symbolic values. If desirable, these symbolic values can also be placed in the test call as input parameters to create the call signature for the parameterized unit test (PUT). The PUT then serves as input to symbolic execution which traverse the object(s) or implementations under test to discover concrete values that provide a desired coverage (e.g., path coverage). The PUT (or TUT) is then called (or in case of a TUT populated) with the concrete values to verify behavior for the desired coverage.

Thus, customers have already written TUTs 602 for various programs. The described methods can leverage those prior existing TUTs to create 104 PUTs that can be symbolically executed 612 to provide better or more complete coverage of those existing IUTs. And, as those existing IUTs are upgraded or otherwise altered, the PUTs as automatically generated from the TUTs, provided automated test coverage of the upgraded or altered IUTs. This value is provided because of the insight that (1) parameterized unit tests can be symbolically executed to create test cases, and (2) PUTs 605 can be created or generalized 604 from existing TUTs 602, and (3) symbolic execution 612 of PUTs will discover paths automatically through altered IUTs, and create test cases for altered IUTs, automatically. Thus, without automatically creating 604 the PUTs 605 from TUTs 602, had to be generated one by one, by a programmer writing source code.

In an even more general sense, a PUT 605 can be generated 610 from an implementation 608. For example, an implementation such as object code, intermediate language code, or source code, serves as input to the generation method 610. Thus, the implementation 608 is not required to be provided in any certain format. In one such example, an implementation is a method, a function, or an object of a program. The generation method 610 receives the implementation as input, assigns symbolic input values to the input parameters of the implementation, and symbolically executes the implementation to discover paths through the implementation. For example, using the techniques described in this specification, an parameterized unit test is generated 610 from the implementation. As described above, an implementation such as a modifier method is explored based on state changes noted via observer methods.

A PUT is automatically inferred 610 from the implementation. The generated PUT can then be symbolically executed to discover concrete input values for testing (exercising) the implementation. Additionally, a PUT generated from an implementation also serves as a specification of the implementations expected behavior.

This insight provides the possibility of not only documenting or specifying an existing implementation via generated PUTs 610, but also provides created test suites (concrete values) for testing and retesting existing implementations. For example, given an exiting implementation 608, the method generates parameterized unit tests. Parameterized unit tests are another way of specifying program behavior. Thus, the method infers a specification from an implementation. Once created, the PUTs can further be used to test or retest the implementations behavior, as it is altered and or upgraded in the software lifecycle.

Additionally, an implementation (e.g., method, function, object, etc.) is a more general form than a TUT. Thus, it is possible that generating a PUT from an implementation instead of a TUT, will provide an even more general exploration. Thus, a more detailed and complete specification of implementation behavior can often be obtained by creating a PUT directly from the implementation itself. Optionally, instead of just generating a PUT in response to an implementation input, the described technology may also provide a specification for the implementation comprising pre-conditions and post conditions. A PUT is a specification also, and this is closely related to a specification comprising pre-conditions and post-conditions. For example, an assertion is a post condition, and a guard on an input is an assertion on the input before the test is run. And, both such types of assertions can be identified via symbolic execution and provided as annotations to a generated PUT, for example, as pre-conditions and post-conditions specifications.

Interestingly, some existing tools, such as Spec# from Microsoft Corporation, receive pre-conditions and/or post-conditions specifications as inputs to check properties. In one example, given a library of implementations of code, it is desirable to understand how the implementations behave. Some implementations come with test that can be generalized, and some do not. Thus, a user directs the described technologies to an implementation and/or a TUT as an input, and a PUT and/or a pre-post-condition specification is generated.

Some of the PUTs can be described in terms of pre-conditions and post-conditions, but not all of them, because a PUT is more general. Although a PUT is more general than a pre-post-condition specification, many such specifications can be derived from PUTs.

Exemplary Symbolic Execution

With symbolic executions, instead of using concrete values, operations are performed on symbolic values. Symbolic execution uses symbolic input values, with abstract names, and then builds expressions as a program manipulates the input symbolic values. Thus, expressions such as A+B are used instead of concrete values, such as 4, as can be computed from 1+3.

Whenever the program execution arrives at a point which can only be reached when a certain condition has been met, e.g., after a conditional branch, a condition or constraint is generated that includes symbolic inputs whose precise value does not have to be determined. For example, a condition could be one or more symbolic values in a relationship (e.g., x<4, y+4<z, etc.).

A symbolic state of a program may map variables to expressions which may include symbolic expressions that may contain concrete values such as constants. Thus, variables hold expressions.

For example, if a table of values has columns representing variables, and rows indicate progressing states of a symbolic execution, expressions are assigned to variables for a state. So instead of a concrete values at a variable or field, there is an expression (e.g., a+b) which represents some operation on the inputs or other state in the program. Of course, the table itself is not required for symbolic execution, it is just an example representing how symbolic execution uses symbols to represent execution.

Consider the following functions max and max4,

```
int max (int x, int y)
{
    if x > y return x;
    else return y; }
int max4 (int x, int y, int z, int w)
{   int u = max (x, y);
    int v = max (z, w);
```

-continued

```
int t = max (u, v);
return t; }
```

If the function max4 (z, y, z, w) is called with symbolic variables, a, b, c, and d instead of concrete integer values, then the following Table L represents a symbolic execution.

TABLE L

| | Variables | | | | | | |
|---|---|---|---|---|---|---|---|
| State | X | Y | Z | W | U | V | t |
| 0 | A | B | C | D | — | — | — |
| 1 | A | B | C | D | A or b | — | — |
| 2 | A | B | C | D | A or b | c or d | — |
| 3 | A | B | C | D | A or b | c or d | a, b, c, or d |

The symbolic execution represents many possible executions for the symbolic inputs a, b, c, and d, thereby representing many instantiations of integer assignments to a, b, c, and d. Symbolic executions may also be represented in other ways, such as a graph, or as a textual description, etc.

Figure 7:
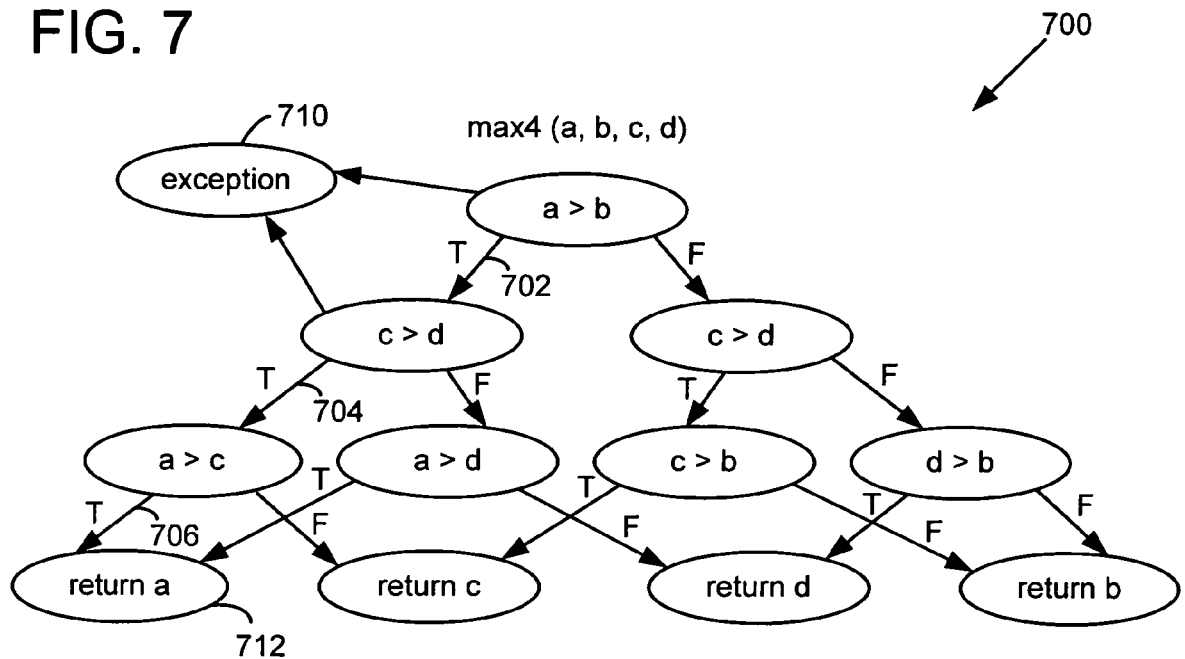
FIG. 7 is a tree representing paths of conditions on exemplary symbolic inputs.

FIG. 7 is a tree representing paths of conditions on exemplary symbolic inputs. For example, the above max functions may traverse the conditions of the tree 700 based on concrete integer assignments to input variables x, y, z, and w. Each path down the tree represents a path that might be tested if providing coverage of a program is desired. Gathering the relationships of operations on symbolic inputs provides information useful in creating concrete assignments to x, y, z, and w. For example, inputs are selected that cover the behavior generated by symbolic execution, such as covering paths of a tree to verify program behavior. Thus, by parameterizing unit tests and performing symbolic execution on symbolic values, concrete assignments that explore the behavior of a method can be generated automatically.

For example, the path constraints leading to state 712 are as follows: ((a>b)^(c>d)^(a>c)). Thus, once symbolic execution provides this path constraint for state 712, the following concrete value assignments will drive the implementation into the state 712: (a=4, b=3, c=2, d=1).

Exemplary Symbolic Execution of Object Oriented Programs

In order to support symbolic executions of object oriented programs, various techniques are considered. Consider the following code,

```
void min(int z, int r)
int x;
int y;
...    }
```

The variables z, r, x, and y are identifiable, and can be traced as the 'min' method executes. However, this is not so straightforward when objects are considered. Consider the following code,

```
Class C {
int f;
```

```
}
void compare (C x, C y, int z, int w) {
    int u = 5           // state = 1
    x.f = z             // state = 2
    y.f = w             // state = 3
    if (x.f == 10)      // state = 4
    ... }
```

If the method 'compare' is called with symbolic values, such as compare (a, b, c, d), then Table M provides one example representation of a symbolic execution.

TABLE M

| | Variables | | | |
|---|---|---|---|---|
| State | u | Z | w | Fields |
| 0 | — | C | d | { } |
| 1 | 5 | C | d | { } |
| 2 | 5 | C | d | update ({ }, a, f, c) |
| 3 | 5 | C | d | update (update ({ }, a, f, c), b, f, d) |

As shown in Table M, input symbols c and d are assigned to input parameters z and w, whereas objects and their associated fields are symbolically noted with a field's column. For example, the objects field's section represents a map of objects and the object's associated field assignments. Thus, the field's column contains symbolic information that can be used to track and create concrete assignments to an arbitrary number of different objects, and to the various and arbitrary assignments that may occur to their associated possibly multiple fields. In this example, an update function contains four parameters. The first parameter is the state of the fields (e.g., heap) before the present update. Here, "{ }" is used to represent the initial heap in which no field has been updated yet. Other initial heaps are possible. The second parameter of the update function is the identifier of a symbolic instantiation 'a' of the class C. The third parameter is the field in 'a' to update, and the fourth parameter contains the symbolic value 'c' that is assigned to field a.f. Conditions can involve a particular state of the fields, e.g., the condition of the if-statement in the above program can be represented by the following expression:

select(update(update({ },a,f,c)b,f,d),a,f)==10

From these symbolic values relationships, concrete value can be automatically generated (via a constraint solver and/or theorem prover) that will explore various paths of a tree representing possible Executions.

Figure 8:
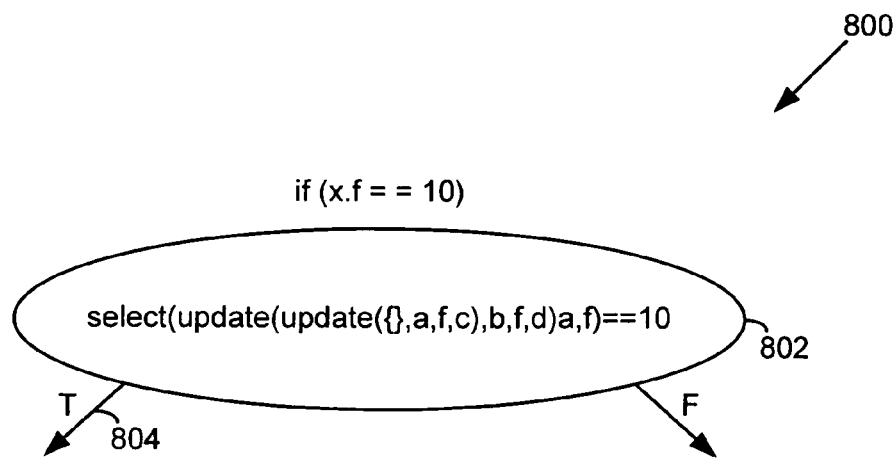
FIG. 8 is a tree representing exemplary paths of conditions of a symbolic execution.

FIG. 8 is a tree representing exemplary paths of conditions of a symbolic execution. For example, a select function obtains a symbolic value at field f of symbolic object 'a' and compares it to constant value '10'. Thus, coverage of this tree is provided by assigning concrete values such that a.f is equal to and not equal to '10' after state 3 of Table M. It is interesting to note that Table M and FIG. 8 represent possibly all calls that can be made on the 'compare' method. For example, even if a and b are the same object, the fields update column of Table F, and the comparison 802 in the tree 800 represent the behavior. Thus, the information is saved in a general way that can be used to generate concrete inputs for coverage, where 'compare' is called with inputs that cover paths of the tree 800, in cases where objects 'a' and 'd' are the same or different, and in cases where variables 'c' and 'd' are the same or different. Test case generation is identifying input values that solve the constraints that exist along one path of a graph (e.g., FIG. 7, 702, 704, 706, or FIG. 8, 804). Often it is desirable to provide a minimum or reduced number of inputs to cover paths of a graph. However, full coverage is not always required, as automated testing of even partial coverage is often valuable. A constraint solver is typically able to solve paths of constraints to provide input values, once the constraint solver is provided the path constraint information developed during symbolic execution.

Example Considerations For Various Implementations

In one example, a Modifier Method is a method of a class, that changes the state of an object instance of the class, whereas, an Observer Method is a method that reads the state of an object instance of that class. In one such example, the following array list class provides a Size method that observers the size of the array and an Add method that adds an element to the array list.

```
class ArrayList {
    int Size (get) // observer: read the size of the array
    void Add (object) // modifier: add element to the array
}
```

In one example, a user desires a specification for the Add (modifier) method. As described, the user selects a modifier method for which a specification is desired. Additionally, the user selects one or more observer methods. The described technology, provides a specification for the selected modifier method. In one such example, the observer method observes state changes made by the modifier method, before and after the state changes are made. Thus, the Size method does not restrict the class, but just reflects changes before and after the Add modifier method is called. In one such example, the changes are noted symbolically, so if the symbolic state of the array list is "OldCount" before the modifier is called, the symbolic state becomes "OldCount+1" after the modifier method is called. Thus, the observer method provides information specifying whether a property of the method is updated by the modifier. In this example, the specification will reflect the precondition of "OldCount" and the post condition of "OldCount+1". This information is used to populate the specification of the modifier method. An axiom such as a parameterized unit test (PUT) usually includes assumptions about entering conditions and then an assert statement to verify that the method has performed as expected. In such a case, the observer helps populate this observed information.

These pre- and post-conditions are generally expected for method specifications. The modifier is the method explored, and the observers are provided to look into the state changes of the modifier relative to an initial state and a modifier method state, or resulting state. These pre- and post-condition specifications are good for program specifications as summaries of program behavior.

There are large libraries of code, and it would be desirable to understand the behavior of the existing libraries. Additionally, some tools such as Spec# of Microsoft Corporation, that generate test cases, require specifications as inputs. So if developers build on top of existing libraries, they need specifications for the libraries. In general, base libraries are typically not changed once released, so the generated specifications can be used as a specification for many years. Thus, this tool can provide a summary of code behavior and the summary is the real behavior since it is based on the actual implementation, as opposed to a human generated specification that may not have been updated as method behaviors evolve. Thus, using the described technology, the code itself provides the information used to create its specification.

Interestingly, there are various ways to support obtaining the pre and post-call information on a modifier. For example, the pre-modifier call state can be obtained by capturing the entire state of the running program before the modifier is called, and then capturing the entire state of the running program after the modifier is called, and then calling each observer on the pre and post states. This provides a general solution that does not assume what state the modifier will change or what state changes the observer(s) will observer. However, it is resource intensive.

As described, the modifier method is symbolically executed, resulting in a set of path conditions leading to a resulting state, or resulting states. Then, for each path to a resulting state, the selected observer methods are executed on the resulting state, as projected onto the initial state. Then for each path, the observer(s) methods are executed on resulting state. Projecting back to the initial state using the path conditions, identifies symbols or state changed along that path. Finally, the method simplifies by merging generated pre/post pairs.

In one such example, the modifier method is executed first, and the path constraints for a given path, are used to project back to the initial state, in order to identify a smaller set of because near the interacting states of the path conditions (i.e. changed state) is often much smaller than all possible state changes.

Thus, instead of saving all possible data structures of the modifier method (and associated class), the path constraints are explored in symbolic execution to observe those changes that turned out to be relevant for the modifier for the path (resulting state) in question.

In another example, the information about the pre and post state changes are identified using a technology described in State as a First-Class-Citizen. See e.g., U.S. patent application Ser. No. 10/650,245, filed Aug. 27, 2003 ("State as a First-Class-Citizen"). Thus, in one example, the described technology uses State as a First-Class-Citizen to obtain information about an initial state and a resulting state. The observer method(s) are executed on the initial and result states in order to provide information used to populate the specifications. Of course the order of the observations and the methods used to save state in order to observe the modifier changes, may vary without departing from the spirit and scope of the described technology.

In one example, during symbolic execution, state is observed as assignments to locations with symbolic values and as a set of constraints that when satisfied, provide a path through an implementation such as a modifier method. In one example, it is these paths of constraints that are important. In the following stack class, a path constraint determines whether a stack is empty before the stack pop method is executed. The precondition of the pop method checks to see if the stack is empty (e.g., Stack.count==0). If the precondition is true, then an exception is thrown, otherwise, an object is popped off the stack.

```
class stack {
    Pop( )          //  modifier method
    Bool IsEmpty( ) //  observer method
}
```

The path conditions are used to partition the initial state into a smaller set of information that is observed for that path, from the initial to the resulting state. Thus, for a given modifier method, for which a specification is desired, it is the path conditions of that method, that are partitioned to observe the possible interesting observable behavior. Thus, projecting back to the initial state, partitions the initial state, according to the modifier behavior. Thus the modifier behavior provides a restricted initial state as projected from the properties of interest of the observer methods. The projections can be determined from the path conditions leading to a resulting state (e.g., FIG. 7, 702, 704, 706).

The partitioned behavior is uniquely determined from a path condition such as an IsEmpty method (e.g., Isempty==T, or Isempty==F). Notice that when the Pop (modifier) method continues, the count will decrease (i.e., count--); so the modifier changes the state. Thus, the count could be reduced to zero; but in this example, the projection is only interested in conditions projected back to the initial state. In this example, the determination is made based on path conditions.

In one such example, symbolic execution starts (initial state) from a fully symbolic state. So the initial value of count is a symbol that does not have a concrete assignment. For example, if the symbol starts as count, then after the pop, the count is decremented (e.g., count=count-1). Thus, if initially the count was assigned symbol "b", then after pop, the count is "b-1". However, this information may not be necessary if the path constraint is provided. In such an example, the path constraints is that either b is zero or it is not (e.g., b=0 or b≠0). Thus, the method obtains the path constraints over each path, and then projects back to look at those constraints in the initial state. Thus, whenever there is a choice as represented by a path constraint, that creates a partition or choice that can be considered in the initial state, and in the resulting state.

Thus, in one example, a method proceeds with the following steps. First, the method symbolically executes the modifier method resulting in a set of path constraints leading to a resulting state. Next, for each path, the method executes the observer method(s) on the resulting state projected onto the initial state, and then the method executes the observer method(s) on the resulting state. Finally, the method finds relationships between observers in the initial and resulting states, and optionally, the method simplifies by merging the observed pre/post condition pairs.

Thus, the method finds relationships between observers in the initial and resulting state. When a symbol is expressed as a relation of path constraints, this provides a relationship that can be reduced or simplified to create part of a specification. As another example, as is known in the computing arts, there are methods that clone instances of objects. If a symbolic object is cloned (e.g., newObject=Clone(oldObject)), then the modifier method can be performed on the newObject, and the oldObject (state) is available to observer method(s) in an initial state. In one such example, during symbolic execution, a symbol "b" is assigned to oldObject.count representing a stack count. Then, after a Pop (modifier) method is executed on the newObject, then newObject.count becomes "b-1". The method finds relationships between observers in the initial state and resulting states, and the relationship is simplified using substitution. The initial state provided oldObject.count=b, and the resulting state provided the relationship newObject.count=b-1. By substitution, a simplified version of the state relation becomes: "newObject.count=oldObject.count-1". Thus, observers return relations on symbols (e.g., newObject.count=b-1) and concrete values (e.g., true, false, 6) and these observations populate the specifications.

In the above example, the technique is to use the same symbolic value "b" so the relation can be provided via substitution. Notice that the specification of Pop (i.e., newObject.count=oldObject.count-1) is human friendly because it provides information in terms of the observer without using symbols (b-1). Thus, the specification provides understanding to humans in addition to other uses such as testing and verification. Notice also, that specifications can be expressed in terms of observers (e.g., a precondition "IsEmpty=False") which provides nice properties to return in axioms. Thus, preferably the specification is provided in terms of observers without symbols used in symbolic execution. In this example, IsEmpty=False is a trivial relationships expressed in terms of the pre-modifier call that does not require solving a relation involving the post observer state. However, a pre/post state relationship is required to provide other specifications, such as shown for the Pop method (i.e., new.count=old.count-1) in order to verify or specify a behavior. This is often the case when a post-modifier-state and a pre-modifier-state are linked via some relation on a symbolic variable (e.g., "b" and "b-1"), as described above.

Additionally, parameters may appear as inputs to modifiers and observers methods. For example, consider an observer method that returns an element of an array without changing the state of the array (e.g., ArrayList.GetItem(i)). In this example, the GetItem( ) method receives an index as input and returns an element from the array at that index. Now, assume further that the GetItem is called before and after a modifier method (e.g., ArrayList.AddItem(Object o)). Thus, GetItem( ) is a parameterized observer, and the parameter in this case is an index that is generated for observation. Thus, when observers are parameterized, an expression is generated for parameter of the observer. Since symbolic execution may start from a fully symbolic state, and an index is generated automatically.

In one example, a set of observer or modifier method input parameters are built up, starting with parameters at hand. The following code provides an example.

```
TestAdd(Arraylist a, Object o) {
    arrayIndex i,               //instantiate local variable
                                "i"
    a.AddItem(o);               //add the item to the
                                array
    1 = a.GetLocation(o);       //locate the item in the
                                array
    Assert(a.GetItem(a.GetSize – 1) == 0);
}
```

In this example, the test code adds an object "o" to an array and then asserts that the item should be located at a certain index. Additionally, the method includes a local variable of the arrayIndex type. In this example, the method draws from something already known. Since a symbol of the desired type is already known, a set or group of arrayIndex types is created. Thus, during symbolic execution, the known type is used to instantiate the input parameter that must be generated from a completely symbolic state. Thus, the symbolic execution instantiates the parameter, the method observes the results of the pre-post instantiations, and the method puts the symbol back in the set or group. As the symbolic execution continues, the set grows from other return values and encountered parameters of the desired type. Thus, the method uses observations from the pre-state to observe more in the post state, and whatever is observed, is put into the set if the types correspond.

In the above example, there are two groups of values. There are values that are put into the Arraylist like "o", and there are indices that index the Arraylist, such as in GetItem( ). In this case, the indices are integers and objects on the list are objects, but in other examples, such as with a HashTable, both the contents and indices may be integers. In the HashTable example, the groups (of integers) are not mixed, so they are built up in separate groups.

Thus, the concept of groups is used to populate and build such parameters. And, in one such example, a user annotates the groups of parameters, and the return values, for the method. In such an example, the user provides inputs such as annotations about parameters, and associated groups. For example, the user indicates that the parameter "i" in GetItem (i) would be in an "Index Group", but the inputs to the array elements such as "o" are in "Object Type" group. This provides one way to limit how the recursive build-up continues, since the members of groups are limited, whether by user annotation, and or by parameter type limitation.

Thus, when executing observers on the resulting state projected onto the initial state and when executing observers on the resulting state, input parameters are populated with members of the groups or sets when there are parameters or returns required as inputs.

Whether or not parameter generation is required, observations generated in the form of pre/post condition observation pairs are often quit large in number. In some examples, there are hundreds of pre/post condition observation pairs generated. Arguably, these pairs represent a specification of behaviors, however, it is better to reduce these to fewer cases when possible, for example, when the specification is used to provide human understanding. Thus, the method simplifies by merging generated pre/post pairs. An example of a simplified pre/post pair is shown above (e.g., new.count=old.count−1).

For example, in Table J above, the Lines of Code (LOC) of the output are reduced from 600 paths to 4 paths, because most are very similar. For example, there is a collision or no collision in a HashTable, and from the outside as seen by the observers, most of these paths don't provide observable external differences, and thus they are reduced to 4 cases in the axioms, as shown in Table K.

In another example, the pop method from the Stack, there are just two cases, where it is empty before the Pop and throws an exception, and when it reduces the count, and Pops the object. However, there an infinite number of ways to Push a stack, depending how big the stack is, and how much space is already used by the stack. But from the outside as seen by an observer, Push methods typically behave in similar ways. During the push, the count increments by one, and externally, it doesn't matter whether the method exceeds available memory and reallocates space, and or copies over elements to new space. Thus, for these various classes of behavior, and depending on which observers are selected for the specification of interest, these paths are merged into a single pre-post condition pair if they represent the same behavior with respect to the observers.

And indeed, if simplification is more involved, heuristics can be even be implemented. For example, sometimes the behavior is not entirely encapsulated. A push method might have a "capacity" observer, that looks for how much space is available in the stack. In such a case, a heuristics is used. If a series of concrete numbers indicate a pattern, that pattern is generalized to a symbol that increases by one. Another heuristic ignores an observer in order to simplify. For example, if you have a large number of passes where the pre/post observers are very similar, for example, if you have 5 observers that are almost always the same, but one varies greatly such as the capacity, then one heuristic is to ignore the capacity observation. Another heuristic determines that observed values are always positive or within a certain range, so the values are replaced with a condition that merges these paths. Additionally, various simplification routines such as constraint solvers and theorem provers can be used to aid in simplification and merging, for example of observed pre and post conditions pairs.

Exemplary Computing Environment

FIG. 9 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that performs particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 9, an exemplary system for implementation includes a conventional computer 920 (such as personal computers, laptops, servers, mainframes, and other variety computers) includes a processing unit 921, a system memory 922, and a system bus 923 that couples various system components including the system memory to the processing unit 921. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 921.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 924 and random access memory (RAM) 925. A basic input/output system (BIOS), containing the basic routines that help to transfer information between elements within the computer 920, such as during start-up, is stored in ROM 924.

The computer 920 further includes a hard disk drive 927, a magnetic disk drive 928, e.g., to read from or write to a removable disk 929, and an optical disk drive 930, e.g., for reading a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the computer 920. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 925, including an operating system 935, one or more application programs 936, other program modules 937, and program data 938; in addition to an implementation of the described specification generation from implementations 956.

A user may enter commands and information into the computer 920 through a keyboard 940 and pointing device, such as a mouse 942. These and other input devices are often connected to the processing unit 921 through a serial port interface 946 that is coupled to the system bus, but may be connected by other interfaces, such as a parallel port, game port or a universal serial bus (USB). A monitor 947 or other type of display device is also connected to the system bus 923 via an interface, such as a video adapter 948. In addition to the monitor, computers typically include other peripheral output devices (not shown), such as speakers and printers.

The computer 920 operates in a networked environment using logical connections to one or more remote computers, such as a remote computer 949. The remote computer 949 may be a server, a router, a peer device or other common network node, and typically includes many or all of the elements described relative to the computer 920, although only a memory storage device 950 has been illustrated. The logical connections depicted include a local area network (LAN) 951 and a wide area network (WAN) 952. Such networking environments are commonplace in offices, enterprise-wide computer networks, intranets and the Internet.

When used in a LAN networking environment, the computer 920 is connected to the local network 951 through a network interface or adapter 953. When used in a WAN networking environment, the computer 920 typically includes a modem 954 or other means for establishing communications (e.g., via the LAN 951 and a gateway or proxy server 955) over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computing devices may be used, wireless or otherwise.

Alternatives

Having described and illustrated the principles of this technology with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of these features may be applied, it should be recognized that the details are illustrative only and should not be taken as limiting the scope of the claims. Rather, we claim as our invention all such embodiments as may come within the scope and spirit of the following claims and equivalents thereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computerized method of generating a specification from an implementation, the method comprising:
   receiving an implementation comprising a modifier method and an observer method of a class implementing an abstract data type, wherein the modifier method is configured to modify state of an object instance of the class and the observer method is configured to return the state of the object instance of the class;
   symbolically executing the modifier method to obtain constrained states of the modifier method by at least performing computations on symbolic values of the modifier method to accumulate path conditions for execution paths of the modifier method;
   wherein the obtained constrained states are created based on final states of the execution paths and the final states projected onto initial state of the execution paths;
   applying the observer method in the obtained constrained states to obtain specialized axioms for the execution paths of the modifier method; and
   creating a specification of the modifier method from the obtained specialized axioms based on generalizing, merging and simplifying the specialized axioms, wherein the specification comprises a parameterized unit test comprising input parameters, program statements, and one or more assertions verifying the behavior of the modifier method.

2. The method of claim 1 wherein the specification is displayed to the user for program understanding.

3. The method of claim 1 wherein the method further comprises:
   generating automated test cases from the specification; and
   executing the test cases on the modifier method.

4. The method of claim 1 wherein creating the specification from the obtained specialized axioms further comprises:
   disjoining preconditions with same postconditions;
   simplifying merged preconditions;
   conjoining postconditions with same preconditions; and
   simplifying merged postconditions.

5. The method of claim 1, wherein symbolically executing the modifier method to obtain the constrained states comprises limiting unrolling loops to fewer than five loops.

6. The method of claim 1 further comprising:
   producing a warning to a user upon determining that two contradictory postconditions from two paths with identical preconditions can not be conjoined; and
   receiving in response to the warning an indication to add an additional observer method.

7. The method of claim 1 further comprising:
   presenting on a computer screen, a graphical user interface comprising selectable modifier methods and observer methods; and
   receiving from a user via the graphical user interface in conjunction with an input device, an indication of the modifier method and the observer method.

8. The method of claim 1 further comprising:
symbolically executing the specification to obtain path constraints;
solving obtained path constraints to obtain concrete values; and
testing the modifier method comprising invoking the specification with the concrete values.

9. The method of claim 1 wherein receiving the implementation comprises the modifier method and plural observer methods.

10. The method of claim 1 wherein the obtained constrained states comprise a conjunction of path conditions encountered traversing the code of the modifier method.

11. A computer system comprising:
a processor;
computer memory;
the computer memory having software components comprising:
an implementation of a class implementing an abstract data type;
a modifier method of the implementation of the abstract data type;
plural observer methods of the implementation of the abstract data type, wherein the modifier method is configured to change state of an object instance of the class and the observer methods are configured to return the state of the object instance of the class;
a symbolic executor for receiving the modifier method and returning modifier path conditions of the modifier method by at least performing computations on symbolic values of the modifier method to accumulate the path conditions for paths of the modifier method;
an observation generator for applying an observer method of the plural observer methods on constrained states of a modifier path of the modifier method to obtain path specific axioms for the modifier path;
wherein the obtained constrained states are created from final states of the modifier path and the final states projected onto initial states of the modifier path; and
a specification generator for creating a specification of the modifier method based on the obtained path specific axioms by simplifying the path specific axioms into general axioms in the form of a parameterized unit test comprising input parameters, program statements, and one or more assertions verifying the behavior of the modifier method.

12. The computer system of claim 11 wherein the observation generator applying the observer method further comprises instantiating a quadruple of an observer method, a state, a constraint, and argument values and wherein the instantiation is made relative to a returned modifier path condition.

13. The computer system of claim 11 wherein the observation generator applying the observer method further comprises:
selecting an instantiation of the observer method;
symbolically executing the observer method to obtain a set of normal results;
adding a fact indicating that a unique ground value is a solution for the set of normal results; and
adding a fact that an instantiation corresponds with a unique result term.

14. The computer system of claim 13 wherein upon reaching a fixpoint while symbolically executing the observer method, the observation generator further comprises:
removing tautologies and facts that refer to state of the implementation;
obtaining likely preconditions as remaining facts that refer to observer method instantiations from an initial state; and
identifying likely postconditions as remaining facts.

15. A computer readable storage medium comprising computer-executable instructions causing a computer to perform a method, the method comprising:
receiving a modifier method and observer methods of a class implementing an abstract data type;
wherein the modifier method changes state of an object instance of the class;
wherein the observer methods read the state of an object instance of the class;
symbolically executing the modifier method to obtain constrained states of the modifier method by at least performing computations on symbolic values of the modifier method to accumulate path conditions for execution paths of the modifier method;
wherein the obtained constrained states are created from final states of the execution paths and the final states projected onto initial states of the execution paths;
applying the observer methods in the obtained constrained states to obtain specialized axioms for the execution paths of the modifier method;
wherein applying the observer methods in the obtained constrained states comprises:
executing the observer methods on the final states projected onto the initial states of the execution paths; and
executing the observer methods on the final states of the execution paths;
creating a specification of the modifier method from the obtained specialized axioms based on generalizing, merging and simplifying the obtained specialized axioms, wherein the specification comprises a parameterized unit test comprising input parameters, program statements, and one or more assertions verifying the behavior of the modifier method;
generating test cases from the specification comprising the parameterized unit test, at least by determining test inputs that satisfy constraints of an execution path found through symbolic execution of the specification;
performing a test of the modifier method using the test cases as inputs; and
wherein the creating the specification from the obtained specialized axioms further comprises:
disjoining preconditions with same postconditions;
simplifying merged preconditions;
conjoining postconditions with same preconditions; and
simplifying merged postconditions.

* * * * *